US012718454B1

(12) United States Patent
Schley et al.

(10) Patent No.: US 12,718,454 B1
(45) Date of Patent: Aug. 25, 2026

(54) COMPUTER-IMPLEMENTED METHODS FOR PROVIDING THREE-DIMENSIONAL GRAPHIC OVERLAYS ON LIVE VIDEOS USING A DEPTH MACHINE LEARNING MODEL

(71) Applicant: Amazon Technologies, Inc., Seattle, WA (US)

(72) Inventors: Ran Schley, Kiryat Bialik (IL); Gabriel Pragier, Herzliya (IL); Lior Fritz, Tel Aviv (IL); Matan Karklinsky, Zur Hadassa (IL); Avi Avraham Ben-Cohen, Holon (IL); Ianir Ideses, Raanana (IL); Joseph Keller, Tel Aviv (IL); Muhammad Raffay Hamid, Seattle, WA (US); Woodrow Arrington, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 18/542,192

(22) Filed: Dec. 15, 2023

(51) Int. Cl.

| | |
|---|---|
| ***G06T 13/40*** | (2011.01) |
| ***G06T 7/11*** | (2017.01) |
| ***G06T 7/50*** | (2017.01) |
| ***G06T 7/73*** | (2017.01) |
| ***G06T 15/40*** | (2011.01) |

(52) U.S. Cl.
CPC ................ *G06T 13/40* (2013.01); *G06T 7/11* (2017.01); *G06T 7/50* (2017.01); *G06T 7/74* (2017.01); *G06T 15/40* (2013.01); *G06T 2207/10016* (2013.01); *G06T 2207/20081* (2013.01); *G06T 2207/30196* (2013.01); *G06T 2207/30228* (2013.01)

(58) Field of Classification Search
None
See application file for complete search history.

(56) References Cited

U.S. PATENT DOCUMENTS 11,468,578 B2 10/2022 Nie et al.
11,568,617 B2 * 1/2023 Sung .................... G06T 19/006
(Continued)

OTHER PUBLICATIONS

Non-Final Office Action, U.S. Appl. No. 18/528,568, Oct. 21, 2025, 14 pages.
(Continued)

*Primary Examiner* — James A Thompson
(74) *Attorney, Agent, or Firm* — NICHOLSON DE VOS WEBSTER & ELLIOTT LLP

(57) ABSTRACT

Techniques for providing graphic overlays on live videos using a depth machine learning (ML) model are described. According to some examples, a computer-implemented method includes receiving a live stream of a sporting event; determining a mapping of a playing surface of the sporting event depicted in the live stream to a frame of the live stream; generating, by a machine learning model, a depth map indicating a corresponding depth for an individual player of a plurality of players depicted in the frame based at least in part on an input of the mapping and an indication of the plurality of players depicted in the frame; and inserting a graphic into the frame of the live stream based at least in part on the depth map.

20 Claims, 20 Drawing Sheets
(4 of 20 Drawing Sheet(s) Filed in Color)

(56) References Cited

U.S. PATENT DOCUMENTS

| | | | | |
|---|---|---|---|---|
| 2011/0150275 | A1* | 6/2011 | Tong | G06T 3/14 382/103 |
| 2019/0378287 | A1* | 12/2019 | Hollander | G06V 10/22 |
| 2020/0346114 | A1 | 11/2020 | Verma et al. | |
| 2021/0383567 | A1* | 12/2021 | Akulshin | G06T 7/75 |
| 2023/0056531 | A1* | 2/2023 | Pedagadi | H04N 21/4348 |

OTHER PUBLICATIONS

Notice of Allowance, U.S. Appl. No. 18/528,568, Apr. 17, 2026, 7 pages.

Requirement for Restriction/Election, U.S. Appl. No. 18/528,318, May 12, 2026, 7 pages.

* cited by examiner

COMPUTER-IMPLEMENTED METHODS FOR PROVIDING THREE-DIMENSIONAL GRAPHIC OVERLAYS ON LIVE VIDEOS USING A DEPTH MACHINE LEARNING MODEL

BACKGROUND

Service providers or content creators (such as businesses, artists, media distribution services, etc.) can employ one or more data centers to deliver content (such as web sites, web content, or other digital data) to users or clients. In certain examples, the content is video of a sporting event. It may be desirable to include a graphic overlay into the video. However, analyzing videos and adding a graphic overlay may be time-consuming and complex, and the available computing resources limited to generating two-dimensional graphics on a field with no players or obstructions on the field, and thus not practical in many scenarios.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various examples in accordance with the present disclosure will be described with reference to the following drawings.

DETAILED DESCRIPTION

Figure 1:
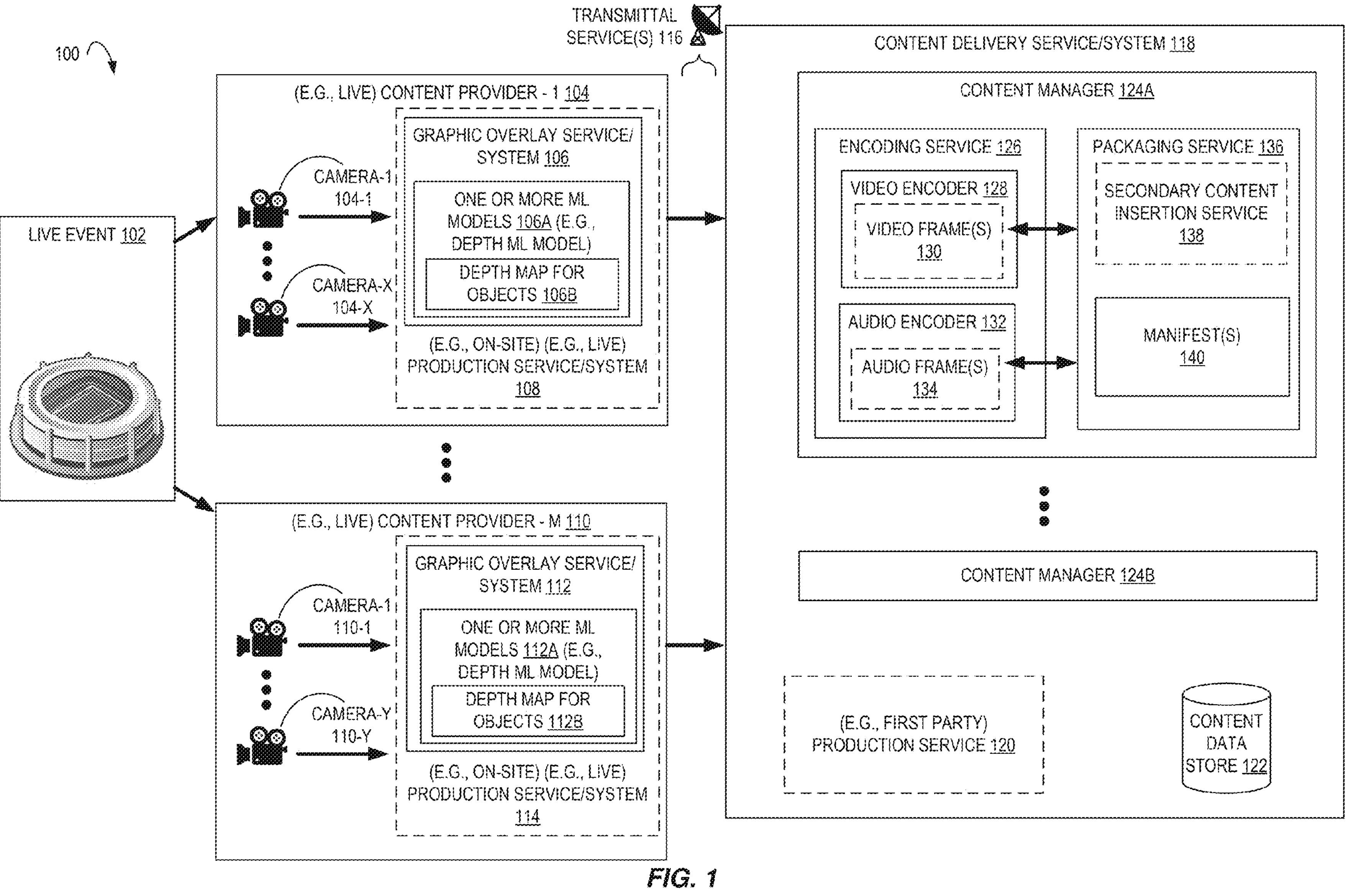
FIG. 1 is a diagram illustrating an environment including one or more content providers (e.g., on-site production service/system) that utilize a machine learning model to add a (e.g., three-dimensional) graphic to a video of a live event, and sends the video with the graphic to a content delivery service/system according to some examples.

The present disclosure relates to methods, apparatus, systems, and non-transitory computer-readable storage media for providing graphic overlays on live videos using a machine learning (ML) model to generate a depth indication (e.g., depth map) for one or more objects depicted in the live videos. Certain examples herein are directed to providing an immersive (e.g., three-dimensional) graphic overlay on (e.g., live sports broadcast) videos using a depth model (e.g., the depth map generated by the depth model). Certain examples herein are directed to a graphic overlay service/system (e.g., depth model thereof) that performs (e.g., real time) graphic insertion, e.g., three-dimensional graphic insertion.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms may mean processing data as it is received as opposed to storing or persisting the data once received for processing later on.

In certain broadcast industries (e.g., sporting events), producers regard and use graphic overlays on top of the live feed as one of their core tools for creating and running the (e.g., televised) show. Graphical two-dimensional overlays in sports broadcasting, such as the yellow line in American football or the indicator below a player holding the ball, may be desirable in certain instances. However, the usage of three-dimensional overlays (e.g., for sport broadcasts) has remained very limited, e.g., being applied only to frames (e.g., scenes) with no players and/or other objects (e.g., obstructions) on the field, for example during halftime.

Certain examples herein are directed to a graphic overlay service/system (e.g., depth model thereof) that enables a depth-based object layering for inserting graphics into (e.g., sporting events) videos. In certain examples, a graphic overlay service/system (e.g., depth model thereof) utilizes a surface (e.g., field) registration (e.g., homography) and an object (e.g., person and/or player) segmentation (e.g., an object segmentation map) to create a consistent depth-based object layering for (e.g., sporting events) videos. Examples herein improve the functioning of a computer-implemented method and a graphic overlay service/system by using a depth model that realistically blends three-dimensional graphics (e.g., overlays) into the playing field, which can be used for advertising (e.g., virtual product placement), display of statistics (e.g., a two-dimensional probability heatmap (e.g., for a field goal attempt)), and/or visual effects (e.g., visualizations of a ball's three-dimensional trajectory or adding animated three-dimensional overlays to support visual effects and/or virtual on-field screens). Certain examples herein apply three-dimensional on-field advertising (e.g., right) before a snap in American football, a free kick in soccer, a free throw in basketball, a face-off in hockey, or at any other time where playing is temporarily stopped without the players leaving the field. In certain examples, a graphic (e.g., overlay) is static or dynamic (e.g., virtual screens, animated figures, etc.). Certain examples herein allow for the showing of game statistics using a three-dimensional overlay. Certain examples herein allow for the showing of a three-dimensional ball trajectory during a kick or a throw in football (or a ball-in-play in baseball/softball). Certain examples herein allow for the applying of three-dimensional visual effects (e.g., having a team logo rise from the field center or three-dimensional animated figures running on the field after a goal is scored).

Certain examples herein are directed to a depth model that allows for the rendering of three-dimensional objects in their exact field position, for example, with realistic obstructions and occlusions from players and other field objects. Examples herein provide for displaying of three-dimensional graphics that are consistent with a scene, e.g., so that players can occlude the graphics and/or be occluded by them. Certain examples herein are directed to a real time, automatic three-dimensional overlay application for use where a video includes one or more players on a playing field. In certain examples, a depth prediction (e.g., depth map) uses prior knowledge of a field template, which is unique to sport imaging, in a depth estimation. Certain examples herein are directed to automatic positioning of three-dimensional overlays for sports broadcasts, while taking into account actual position of players and/or a ball (or other playing objects) in order to create an optimal viewing experience. Certain examples herein are directed to an automatic, hardware-free camera calibration that enables application of two-dimensional and/or three-dimensional graphical overlays in real time, for example, without the need for external camera sensors (e.g., pan, tilt, and zoom (PTZ) data) and/or an on-premise calibration process, e.g., and is thus applicable to third-party events as well as first-party events, and allows calibration of freely-moving (e.g., three-dimensionally moving) cameras (e.g., such as a Skycam brand camera). Certain examples herein provide for a novel view synthesis, e.g., to automatically calibrate freely moving cameras, position three-dimensional overlays in synthesized scenes, and/or augment a three-dimensional world model with depth information.

Turning now to the figures, FIG. 1 is a diagram illustrating an environment 100 including one or more content providers 104, 110 (e.g., and corresponding graphic overlay service/system 106, 112) that utilize a machine learning model 106A, 112A (respectively) to add a (e.g., three-dimensional) graphic to a video of a live event, and sends the video with the graphic to a content delivery service/system 118 according to some examples.

Although multiple content providers and camera are shown, it should be understood that a single content provider and single camera may be utilized. FIG. 1 includes a first content provider 104 and a second content provider 110 to capture a live event 102 on a respective set of one or more cameras (e.g., one or more of cameras 104-1 to 104-X, where X is any positive integer greater than one, and one or more of cameras 110-1 to 110-Y, where Y is any positive integer greater than one) (e.g., and microphones) and transmit the video (e.g., live stream) (e.g., along with the corresponding audio) to a content delivery service/system 118 having an encoding service 126 according to some examples.

In certain examples, the live event 102 is a game of a sporting match, such as, but not limited to, each individual event (e.g., game) of baseball, softball, football, soccer, basketball, hockey, skiing, climbing, etc. In certain examples, one or more (e.g., live) content providers (e.g., video production truck(s)) are on site to capture video (e.g., and audio) of the live event 102.

Figure 9:
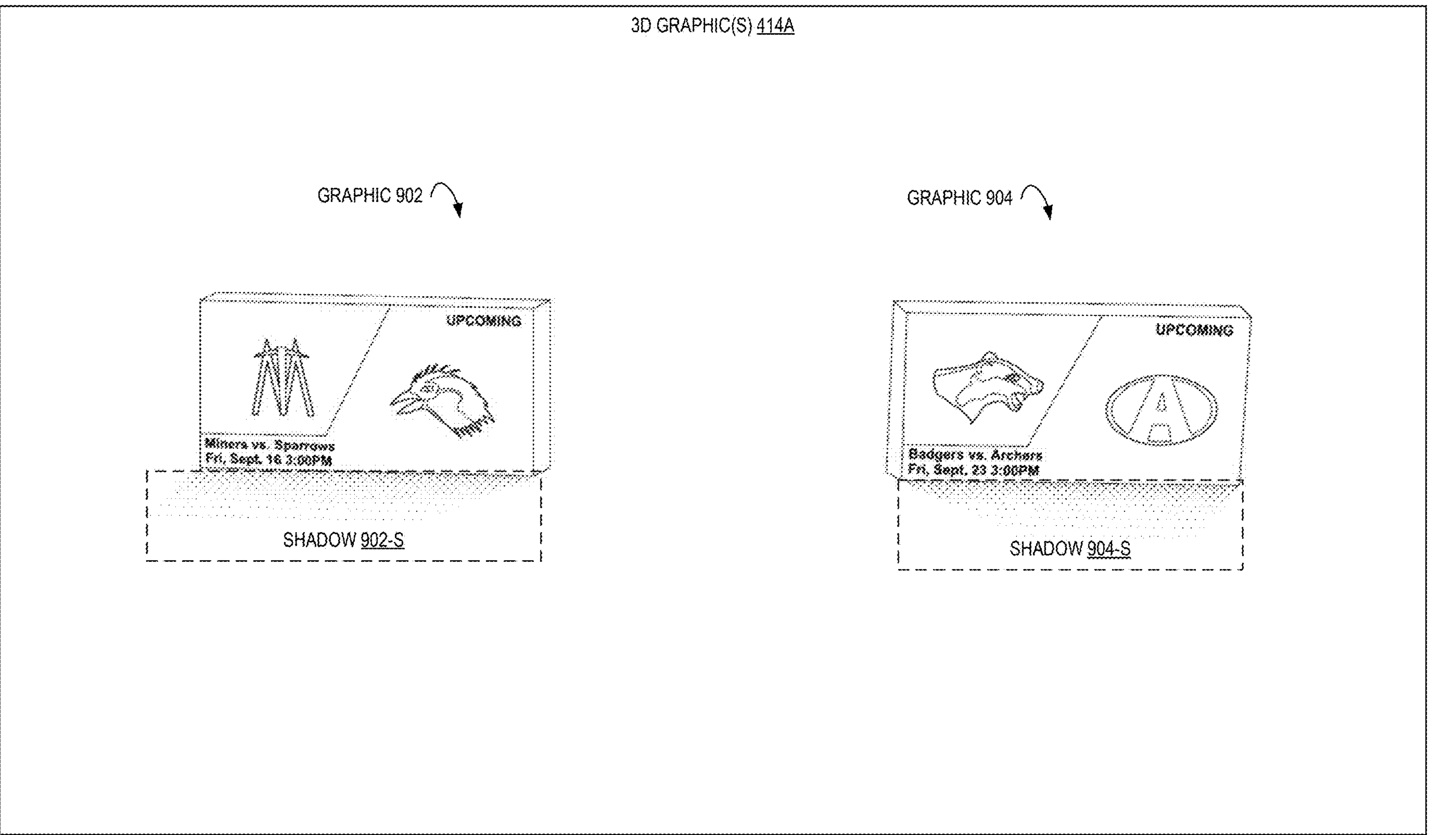
FIG. 9 is a diagram illustrating a first three-dimensional graphic and a second three-dimensional graphic to be used by a graphic overlay service/system according to some examples.

In certain examples, a (e.g., single) content provider 104 is on site to capture video (e.g., and audio) of the live event 102. In certain examples, content provider 104 includes (e.g., or has access to the video output of) one or more of cameras 104-1 to 104-X. In certain examples, content provider 104 includes a graphic overlay service/system 106, for example, to overlay a graphic (e.g., image) onto one or more frames of a video of an event (e.g., live event 102), e.g., to generate a video with an inserted graphic. In certain examples, a graphic includes a (e.g., visual) representation of statistics and/or metrics relevant to the event, e.g., for a particular participant in the event. In certain examples, the graphic may include a player participation report, performance metrics, and/or statistics. In certain examples, statistics (e.g., for American football) include the distance traveled, formations (e.g., offense and defense), completion probability, maximum speed of a player, coverage, expected rushing yards, time on field, route detection, and/or win probability. In certain examples, the graphic is a three-dimensional image, e.g., as shown in FIG. 9. In certain examples, a graphic is an advertisement, e.g., related to the content being shown. In certain examples, the graphic is a video (e.g., or an animation that is a set of successive images that changes over time) or any other media, e.g., including a real or inanimate object.

Figure 14:
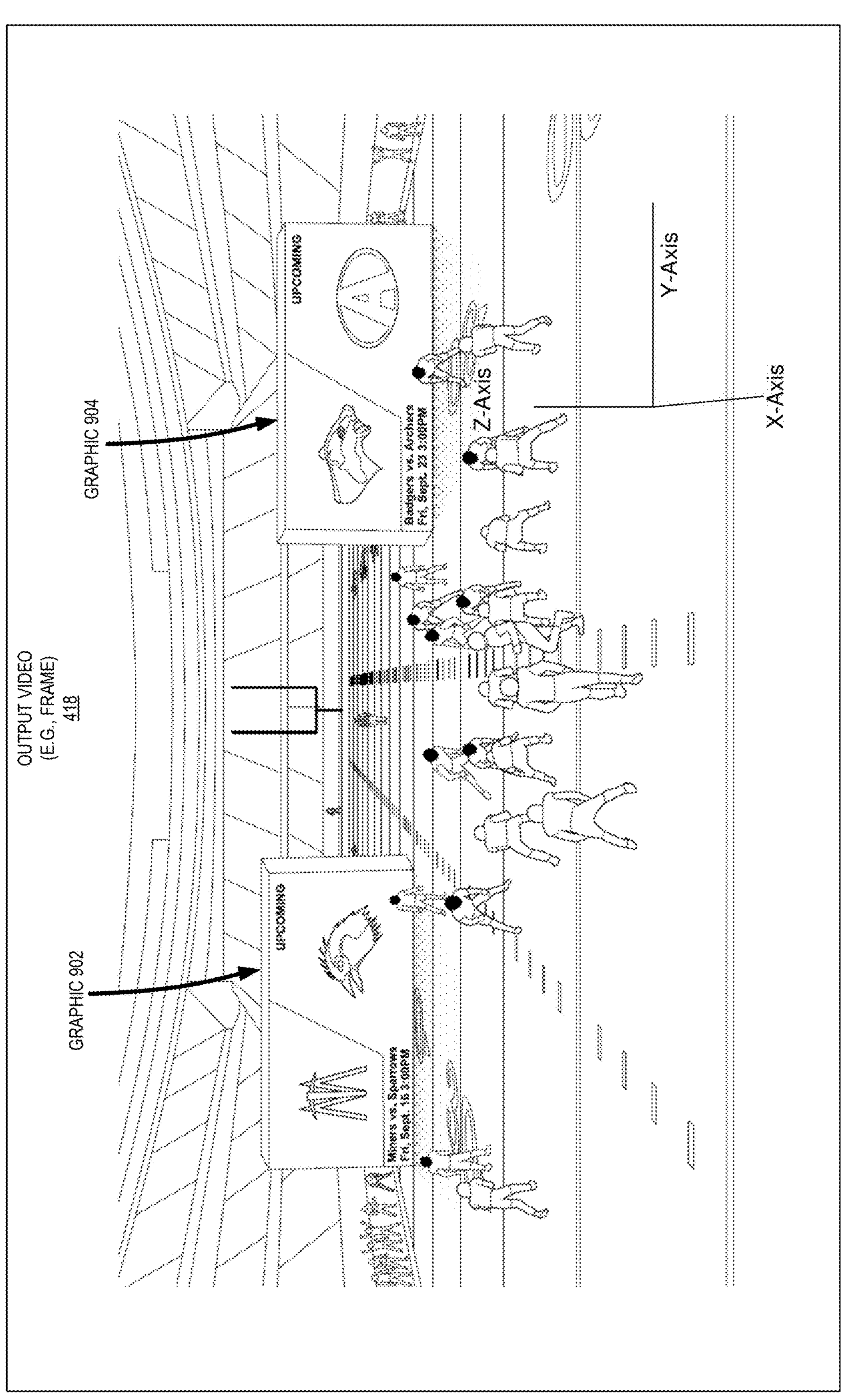
FIG. 14 is a diagram illustrating an output frame generated by inserting (e.g., overlaying) the first three-dimensional graphic and the second three-dimensional graphic in FIG. 9 into the input video frame of FIG. 5 according to a depth map by a graphic overlay service/system according to some examples.

In certain examples, content provider 104 includes graphic overlay service/system 106 to generate depth map 106B for objects, e.g., a depth map used to blend a three-dimensional graphic (e.g., overlay) onto the playing surface (e.g., playing field) depicted in a video, e.g., from camera(s) 104-1 to 104-X. In certain examples, content provider 110 includes graphic overlay service/system 112 to generate depth map 112B for objects, e.g., a depth map used to blend a three-dimensional graphic (e.g., overlay) onto the playing surface (e.g., playing field) depicted in a video, e.g., from camera(s) 110-1 to 110-Y. In certain examples, the graphic overlay service/system 106, 110 inserts a graphic into each frame of multiple frames (e.g., based on one or more depth maps) of a video, e.g., in different orientations (e.g., skew)

and/or scale for each frame so that the graphic appears to be physically attached (e.g., anchored) to a certain (e.g., playing) surface in the video (e.g., as shown in FIG. 14). An example of a graphic overlay service/system is discussed further in reference to FIG. 4. In certain examples, the term "anchored" is used to emphasize that a same physical point is identifiable as a video progresses (e.g., frame by frame) and a corresponding camera moves. In certain examples, the image locations (e.g., pixels) of these surface-anchored physical points will change from one video frame to the next where the camera is moving with respect to the surface. In certain examples, these image points (e.g., the images of the surface-anchored physical points) are referred to as surface-anchored points, although from the context it should be clear when this means "the moving image locations of fixed/anchored physical points of the surface". In certain examples, these image points are used to overlay graphics on the video, e.g., in order to make it seem as if the graphics are actually affixed (e.g., painted), and hence "anchored", on the physical surface.

In certain examples, the graphic overlay service/system 106 (e.g., ML model 106A thereof) is implemented in a (e.g., on-site) (e.g., live) production service/system 108, e.g., implemented by the computing resources of a production truck. In certain examples, content provider 104 includes a (e.g., on-site) (e.g., live) production service 108, e.g., to allow multi-camera video production such that the video from two or more cameras and/or the audio from two or more audio sources are combined into a single output as a dynamic mix (e.g., by a director). In certain examples, content provider 104 is to encode the resulting output (e.g., and provide a graphic overlay in the output) and send that encoded content to one or more downstream entities (e.g., content delivery service/system 118 and/or user(s)), for example, via (e.g., wired and/or wireless) transmittal services 116, e.g., via one or more networks.

In certain examples, one or more additional (e.g., M−1, where M is any positive integer greater than 1) content providers (e.g., content provider 110) are also on site to capture video (e.g., and audio) of the live event 102 and provide graphic overlay, e.g., via a corresponding depth map 112B from graphic overlay service/system 112 (e.g., ML model 112A thereof). In certain examples, graphic overlay service/system 112 (e.g., ML model 112A thereof) is an instance of graphic overlay service/system 106 (e.g., ML model 106A thereof). In certain examples, content provider 110 includes (e.g., or has access to the video output of) one or more of cameras 110-1 to 110-Y. In certain examples, content provider 110 includes a (e.g., on-site) (e.g., live) production service 114 (e.g., implemented by the computing resources of a production truck), e.g., to allow multi-camera video production such that the video from two or more cameras and/or the audio from two or more audio sources are combined into a single output as a dynamic mix (e.g., by a director). In certain examples, content provider 110 is to encode the resulting output (e.g., and provide a graphic overlay in the output) and send that encoded content to one or more downstream entities (e.g., content delivery service/system 118 and/or user(s)), for example, via (e.g., wired and/or wireless) transmittal services 116, e.g., via one or more networks.

In certain examples when content providers are different (e.g., different entities, such (e.g., different live streamers or "television" networks), they may use different graphic overlays and/or different transmittal services 116.

In certain examples, the content (e.g., with graphic overlay) from content provider(s) 104, 110, etc. is sent to one or more content delivery services/systems (e.g., content delivery service/system 118).

The depicted content delivery service/system 118 includes a content data store 122, which may be implemented in one or more data centers. As one example, a media file (e.g., including a video file and an audio file) (e.g., a media container) that is to be encoded is accessed from the content data store 122 by one or more content managers 124A-124B. In certain examples, the media file may be uploaded to content data store 122 by content provider(s) or provided directly (e.g., as live content) to one or more content managers 124A-124B by content provider(s) (e.g., from a live content encoder).

In certain examples, the content manager (e.g., described in reference to content manager 124A, but one or more other content managers may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 126 is to encode the media file (e.g., video file and corresponding audio file) into one or more sets of video and audio representations (e.g., streams). In FIG. 1, video encoder 128 is to receive an input of a video file and create video frame(s) 130 from that video file, e.g., for a video frame and/or fragment duration. In FIG. 1, audio encoder 132 is to receive an input of an audio file and create audio frame(s) 134 (e.g., a number of audio samples within each frame) for that audio file, e.g., at an audio frame and/or fragment duration. In certain examples, packaging service 136 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 126 may include a plurality of instances of video encoder 128 and audio encoder 132, e.g., to process multiple inputs in parallel. In certain examples, secondary content insertion service 138 adds secondary content (e.g., advertisement(s)) into a main content. In certain examples, encoding service 126 is to encode both the main content and the secondary content, e.g., and the secondary content insertion service 138 is to insert the secondary content into the main content. In certain examples, secondary content insertion service 138 includes a graphic overlay service/system (e.g., to generate and/or use a depth map according to the disclosure).

Figure 2:
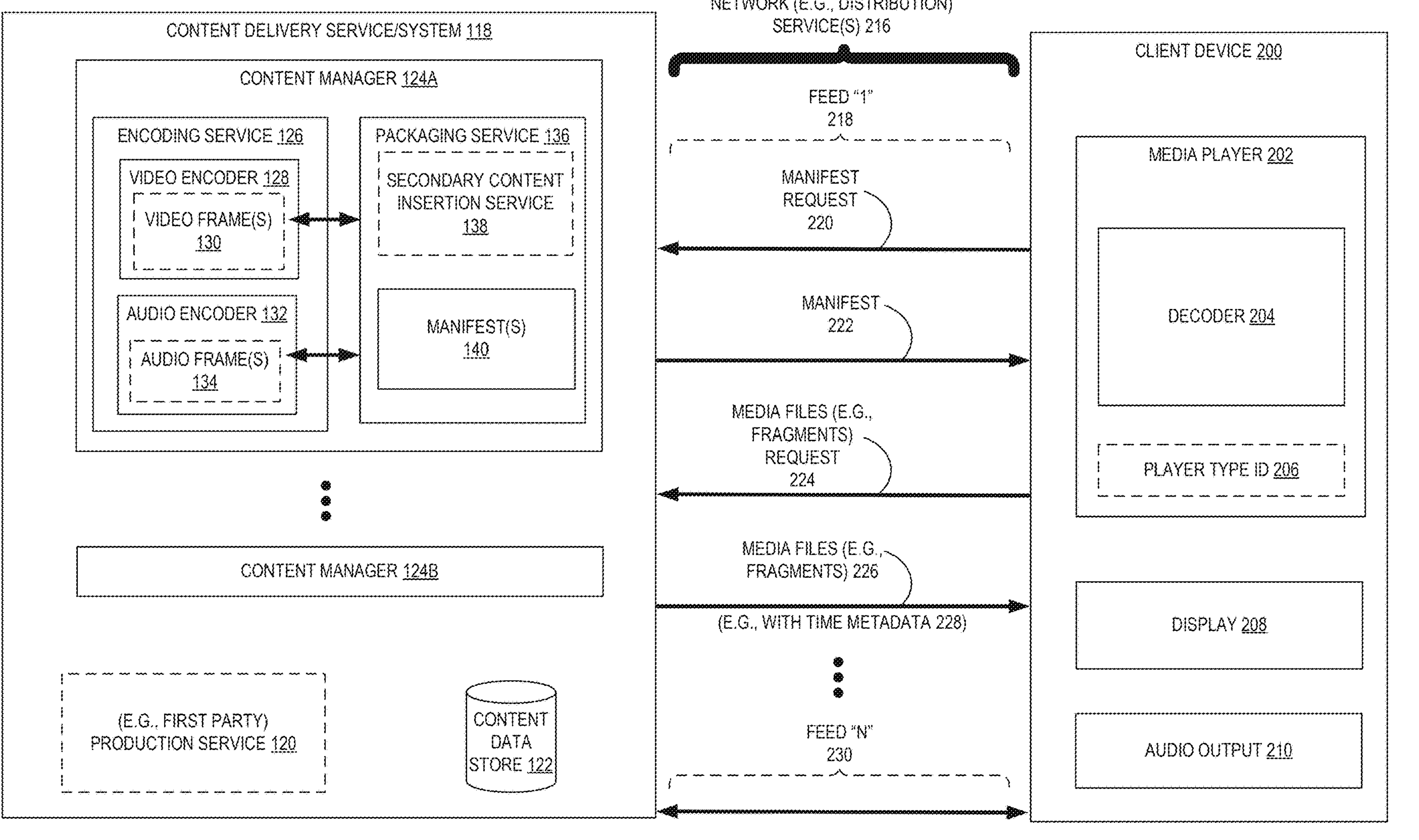
FIG. 2 is a diagram illustrating a content delivery service/system to send videos (e.g., live streams) to a client device according to some examples.

FIG. 2 is a diagram illustrating a content delivery service/system 118 to send videos (e.g., live streams) to a client device 200 according to some examples. In certain examples, client device 200 includes a media player 202 to play one or more feeds (e.g., live streams), for example, sent via network (e.g., distribution) services 216. In certain examples, media player 202 includes a decoder 204 to decode a feed for viewing on display 208, e.g., displaying the video with a graphic overlaid.

In certain examples, content delivery service/system 118 includes a (e.g., first party) production service 120, e.g., to allow multi-provider video production such that the video from two or more providers and/or the audio from two or more audio providers are combined into a single output as a dynamic mix (e.g., by a director). In certain examples, content delivery service/system 118 is to encode the resulting output and send that encoded content to one or more downstream entities (e.g., one or more instances of client device 200), for example, via (e.g., wired and/or wireless) network services 216.

In certain examples, packaging service 136 includes one or more manifests 140, e.g., identifying the media file(s) (e.g., fragments, streams, etc.) to be output from content manager. In certain examples, a manifest for a particular media file (e.g., a particular title) identifies a proper subset of video and audio representations of the media file for a particular client device 200 (e.g., based on the client's media player 202 (e.g., determined from its type ID value 206, display 208 resolution, audio output 210 capabilities, and/or available bandwidth)). In certain examples, the content is sourced from the content delivery service/system 118 in two parts: (i) the manifest 140 of all available media representations (e.g., their URL addresses and, optionally, other characteristics) and (ii) the media files (e.g., representations) (e.g., stream of fragments) in a single (e.g., container) or multiple files.

In certain examples, a client device 200 is to read (or store) a manifest 140 (e.g., sent in response to manifest request 220) before the client device may make a request 224 for the media from that manifest, and thus access media files (e.g., audio fragments and corresponding video fragments) from media file content delivery service/system 118 (e.g., content data store 122), e.g., the URL for a live feed. In certain examples, to play feed 1 218, a client device 200 is to read manifest 222 (e.g., sent in response to manifest request 220) before the client device may make a request 224 for the media indicated by that manifest, and thus access media files 226 (e.g., audio fragments and corresponding video fragments, e.g., and time metadata 228) from media file content delivery service/system 118 (e.g., content data store 122), e.g., the URL for live feed 1 218 (e.g., with graphic overlay).

Figure 3:
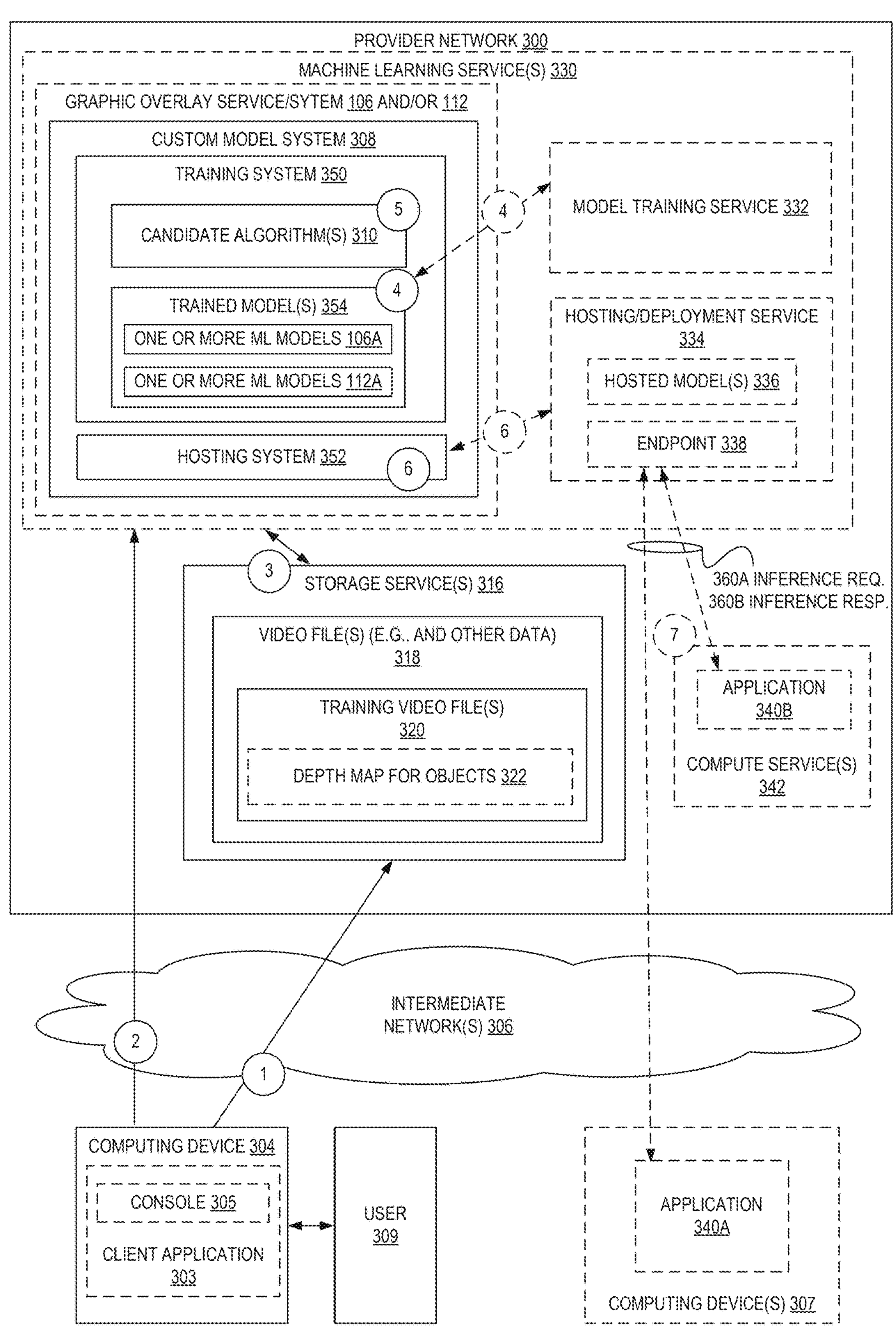
FIG. 3 is a diagram illustrating an environment for creating, training, and using a machine learning model according to some examples.

In certain examples, a client device 200 is to switch between feeds, e.g., switch from a first feed 218 being currently displayed on display 208 to a second feed (e.g., feed "N" 230, where N is any positive integer greater than one), e.g., via a request from a user as discussed further in reference to FIG. 3. In certain examples, to play feed 2 230, a client device 200 is to read a manifest (e.g., sent in response to manifest request) before the client device may make a request for the media indicated by that manifest, and thus access media files (e.g., audio fragments and corresponding video fragments, e.g., and time metadata) from media file content delivery service/system 118 (e.g., content data store 122), e.g., the URL for live feed 2 230 (e.g., with graphic overlay).

FIG. 3 is a diagram illustrating an environment for creating, training, and using a machine learning model according to some examples. FIG. 3 includes a graphic overlay service 106 and/or 112, one or more storage services 316, one or more machine learning services 330, one or more model training services 332, one or more hosting/deployment services 334, and one or more compute services 342 implemented within a multi-tenant provider network 300. Each of the graphic overlay service 106 and/or 112, one or more storage services 316, one or more machine learning services 330, one or more model training services 332, one or more hosting/deployment services 334, and one or more compute services 342 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 342), a storage service 316 that can store data objects (such as video files 318), etc. The users (or "customers") of provider networks 300 may utilize one or more user accounts that are associated with a customer account, though these terms may be used somewhat interchangeably depending upon the context of use. Users may interact with a provider network 300 across one or more intermediate networks 306 (e.g., the internet) via one or more interface(s), such as through use of application programming interface (API) calls, via a console 305 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 300 by an on-demand code execution service (which may be one of compute service(s) 342) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 340B) that can be executed on demand, without requiring the user to maintain dedicated infrastructure to execute the serverless function. Instead, the serverless functions can be executed on demand using resources maintained by the provider network 300. In some examples, these resources may be maintained in a "ready" state (e.g., having a pre-initialized runtime environment configured to execute the serverless functions), allowing the serverless functions to be executed in near real time.

The graphic overlay service 106 and/or 112, in some examples, includes a machine learning powered service that makes it easy for users to build and use trained model(s) 354 (e.g., model(s) 106A and/or model(s) 112A), e.g., to build and use a trained model 354 that infers a depth indication (for example, a mapping indicating one or more objects to be occluded, e.g., depth map) for one or more objects depicted in a frame (e.g., video). Certain examples herein are directed to providing (e.g., via model(s) 106A and/or model(s) 112A) an immersive (e.g., three-dimensional) graphic overlay into (e.g., live sports broadcast) videos, e.g., using an inferred depth indication (e.g., depth map).

The custom model system 308, for example, may enable users to generate trained models 354 from candidate algorithms 310. Examples herein allow a customer to create trained models 354 (e.g., ML models 106A and/or 112A) by supplying data, e.g., training video files 320 (e.g., with corresponding depth map(s) 322 for objects in a video). Data 318 may include (e.g., labeled) training data and/or evaluation data.

At a high level, machine learning may include two major components that are required to be put in place in order to expose advertised functionality to the customer: (i) training (e.g., by training system 350) and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 310 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 309 may provide or otherwise identify data 318 (e.g., training video files 320 and/or depth map(s) 322 for objects in a video) for use in creating a custom model. For example, as shown at circle (1), the user 309 may utilize a client application 303 executed by a computing device 304 (e.g., a web-application implementing a console 305 for the provider network 300, a standalone application, another web-application of another entity that utilizes the graphic overlay service 106 and/or 112 as a part of its backend, a database or mixed-SQL environment, etc.) to cause the computing device 304 to upload the video file(s) 318 to a storage location (e.g., provided by a storage service 316 such as an object storage service of a provider network 300).

The data 318 may be a video file and a columnar dataset that includes rows (or entries) of data values (e.g., depth map(s) 322 for objects in a video), where the data values may be arranged according to one or more columns (or attributes) and may be of a same datatype (e.g., one storing text). In some cases, the data 318 includes headings or other metadata describing names or datatypes of the columns, though in some cases this metadata may not exist. For example, some or all of the data 318 may have been provided by a user as a plaintext file (e.g., a comma-separated values (CSV) or tab-separated values (TSV) file), an exported database table or structure, an application-specific file such as a spreadsheet, etc.

For example, when a user 309 desires to train a candidate algorithm 310, this file (or files) may be a CSV with at least two values per row—e.g., one column for each coordinate (e.g., (X, Y) or (X, Y, Z) coordinates), one column for the visibility probability, and/or another column storing a frame ID that indicates the corresponding frame(s), e.g., "coordinates, class, frame".

Thereafter, at circle (2) the computing device 304 may issue one or more requests (e.g., API calls) to the machine learning service 330 that indicate the user's 309 desire to train one or more candidate algorithms 310 into one or more trained models 354. The request may be of a type that identifies which type of model(s) are to be created or identifies that the machine learning service 330 itself is to identify the candidate algorithms(s) 310. The request may also include one or more of an identifier of a storage location or locations storing the data 318 (e.g., an identifier of the training video files 320 and/or depth map(s) 322 for objects in a video), which may identify a storage location (e.g., via a Uniform Resource Locator (URL), a bucket/folder identifier, etc.) within the provider network 300 (e.g., as offered by a storage service 316) or external to the provider network 300, a format identifier of the data 318, a language identifier of the language of the data 318, etc. In some examples, the request includes an identifier (e.g., from the user 309) of the candidate algorithms(s) 310 themselves within the request.

Responsive to receipt of the request, the custom model system 308 of the machine learning service 330 is invoked and begins operations for training the corresponding type of model. For example, the custom model system 308 may identify what type of model is to be trained (e.g., via analyzing the method call associated with the request), the storage location(s) associated with the data 318 (e.g., training video files 320 and/or depth map(s) 322 for objects in a video), etc. Thus, the custom model system 308 may retrieve any stored data 318 (e.g., videos) as shown at circle (3), which may be from a storage location within the provider network 300 or external to the provider network 300.

In some examples, the training (at circle (4)) of the candidate algorithms 310 includes performing (at optional, dotted circle (4)) candidate algorithms 310 by training service 332 of machine learning service 330 described herein a particular training job (e.g., hyperparameter optimization tuning job), or the like. In some examples, the machine learning services 330 includes (at optional, dotted circle (5)) selecting of a proper subset of candidate models from a plurality of candidate algorithms 310 for training by training service 332. In some examples, the hosting system 352 (at circle (6)) of the custom model system 308 may make use (at optional, dotted circle (6)) of a hosting/deployment service 334 of a machine learning service 330 to deploy a model (e.g., to a production truck) as a hosted model 336 (e.g., ML model 106A and/or ML model 112A in FIG. 1) in association with an endpoint 338 that can receive inference requests from client applications 340A and/or 340B at circle (7), provide the inference requests 360A to the associated hosted model(s) 336, and provide inference results 360B (e.g., a prediction, including, but not limited to, predicted classes, predicted entities, predicted events, etc.) back to applications 340A and/or 340B, which may be executed by one or more computing devices 307 outside of the provider network 300 or by one or more computing devices of a compute service 342 (e.g., hardware virtualization service, serverless code execution service, etc.) within the provider network 300. Inference results 360B may be displayed to a user (e.g., in a graphical user interface of the application) and/or exported as a data structure (e.g., in a selected format). The trained model 354 may then be used, e.g., within graphic overlay service (or system) 106 and/or 112.

Figure 4:
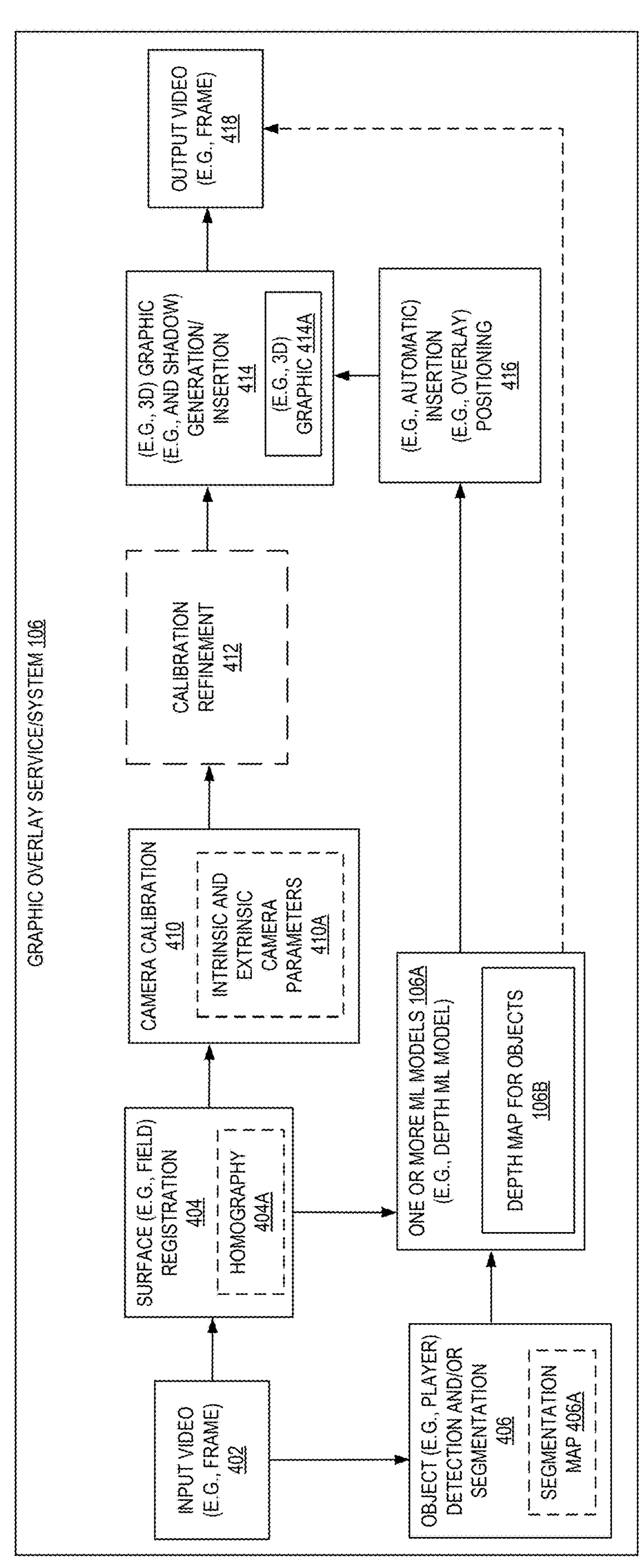
FIG. 4 is a diagram illustrating a graphic overlay service/system including a machine learning model (e.g., depth machine learning model) according to some examples.

FIG. 4 is a diagram illustrating a graphic overlay service/system 106 (and/or 112) including a machine learning model 106A (e.g., depth machine learning model) according to some examples. In certain examples, graphic overlay service/system 106 (and/or 112) takes as input a video (e.g., one or more frames thereof) 402 and outputs a video 418 that includes (e.g., three-dimensional) graphic 414A overlaid into video 402 (e.g., one or more frames thereof).

In certain examples, graphic overlay service/system 106 (and/or 112) includes surface (e.g., field) registration (e.g., module) 404, e.g., that determines a mapping of a (e.g., playing) surface (e.g., football field surface shown in FIG. 5) of an (e.g., sporting) event depicted in the video 402 to a frame 402 (e.g., the pixels of the frame) of the video 402. In certain examples, the mapping is a homography 404A (e.g., homographic transformation parameters and/or a homographic matrix) for an image, e.g., the homography between an image plane and a ground plane (e.g., between a two-dimension plane of the image to a two-dimension plane of the playing field).

Figure 10:
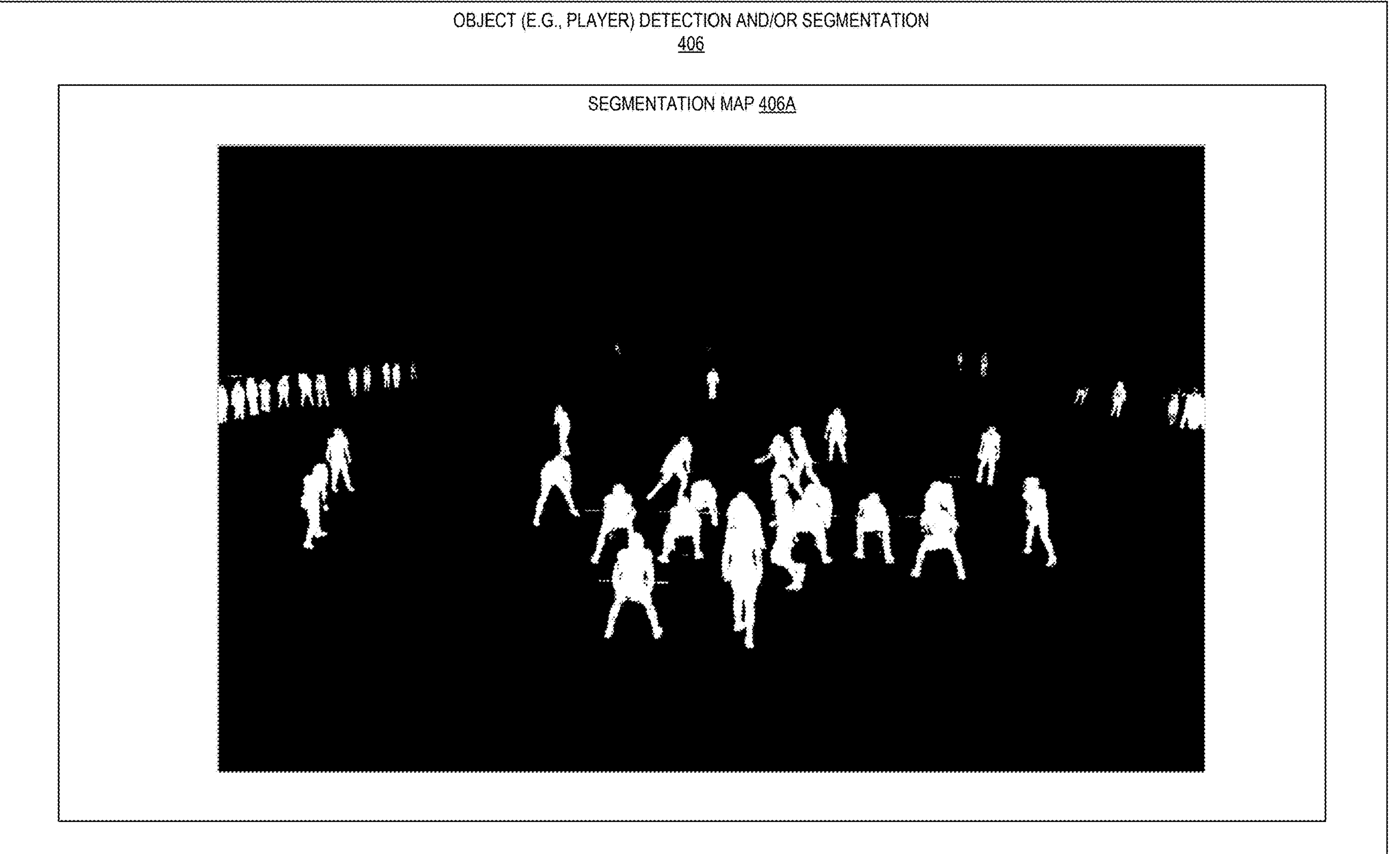
FIG. 10 is a diagram illustrating a segmentation map for the people depicted in the frame in FIG. 5 generated by object (e.g., people) detection and/or segmentation of a graphic overlay service/system according to some examples.

In certain examples, graphic overlay service/system 106 (and/or 112) includes object (e.g., person) detection and/or segmentation (e.g., module) 406, e.g., that generates a (e.g., player) segmentation map 406A (e.g., as shown in FIG. 10). In certain examples, object (e.g., person) detection and/or segmentation (e.g., module) 406 is a machine learning model for identifying (e.g., as a class) a particular object(s), e.g., identifying people versus non-people (e.g., a field, maintenance equipment, etc.).

Figure 11:
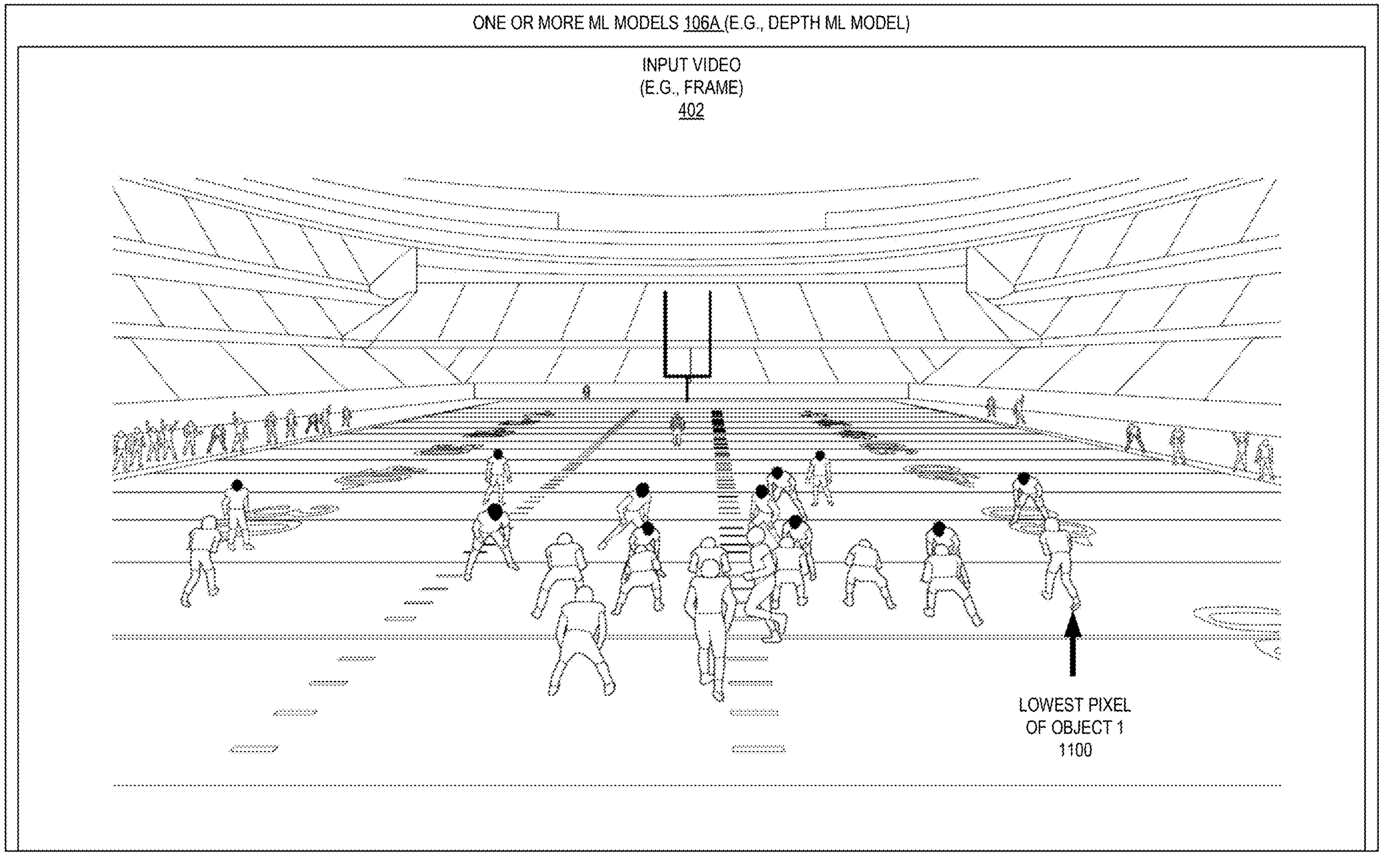
FIG. 11 is a diagram illustrating the lowest pixel in a first object (e.g., person) depicted in the frame in FIG. 5 according to some examples.
Figure 12:
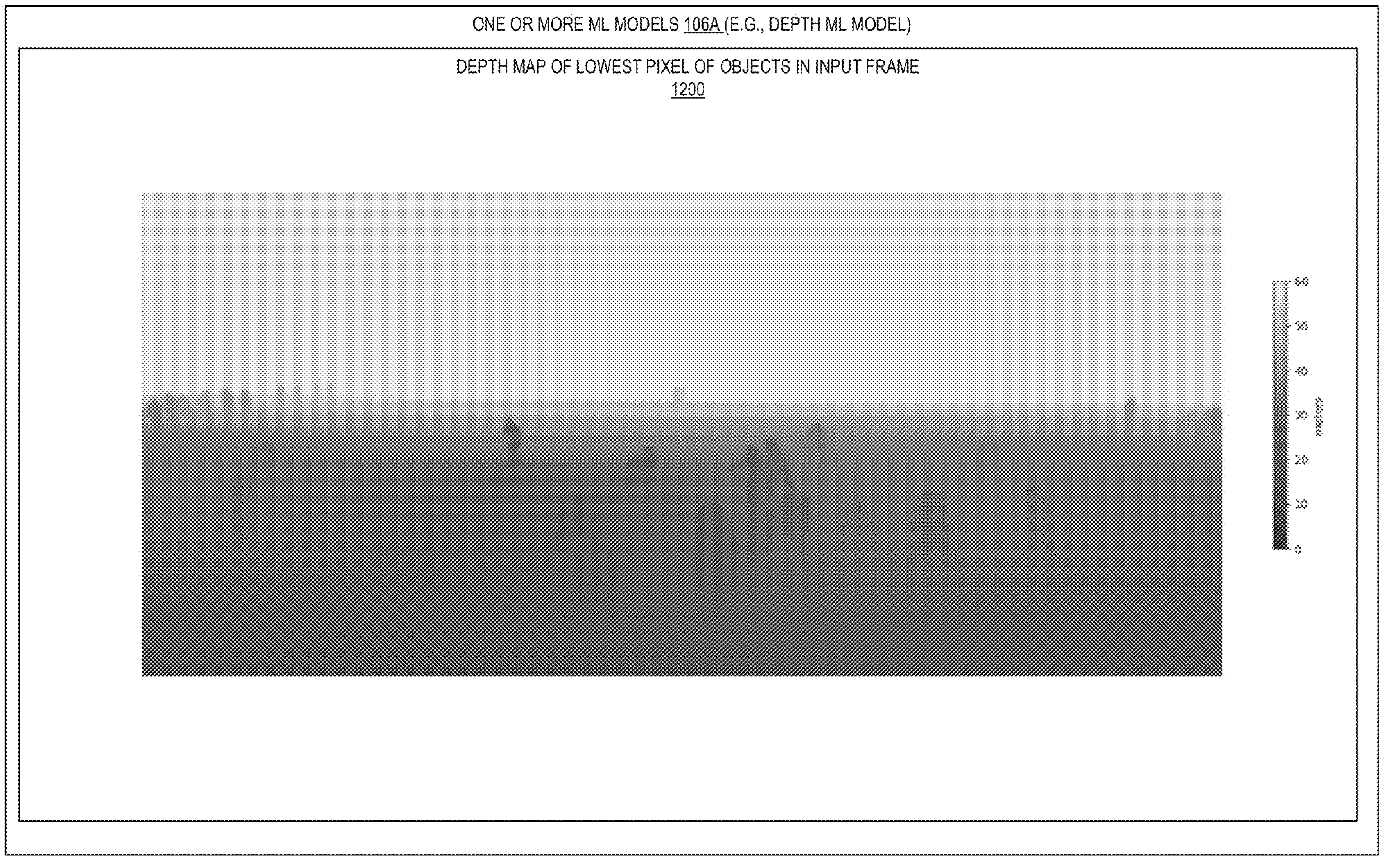
FIG. 12 is a diagram illustrating a depth map of the lowest pixel for each of the objects (e.g., people) and the field depicted in the frame in FIG. 5 according to some examples.

In certain examples, graphic overlay service/system 106 (and/or 112) includes one or more ML models 106A (e.g., a depth model), e.g., that generates a depth map for objects (e.g., a depth map for people as shown in FIGS. 12 and/or 13). In certain examples, one or more ML models 106A (e.g., a depth model) takes as an input the mapping (e.g., homography 404A) of the surface and the segmentation indication (e.g., segmentation map 406A), and generates a depth map 106B for objects (e.g., a depth map for people as shown in FIGS. 12 and/or 13). In certain examples, the graphic overlay service/system 106 (and/or 112) (e.g., depth model) (i) determines a pixel of each person (e.g., player) of a plurality of people (e.g., players) depicted in the frame that is closest to the playing surface (e.g., as shown in FIG. 11), (ii) determines a (e.g., two-dimensional) position of the pixel for each player from the surface mapping (e.g., homography 404A), and (iii) applies the position of the pixel for each person (e.g., player) to a plurality of pixels of a corresponding person (e.g., player) indicated by the player segmentation map 406A to generate the depth map 106B.

In certain examples, graphic overlay service/system 106 (and/or 112) includes camera calibration (e.g., module) 410, e.g., that generates intrinsic and extrinsic camera parameters (e.g., camera position, focal length, and/or orientation parameters) 410A. In certain examples, camera calibration (e.g., module) 410 takes as input the surface mapping (e.g., homography 404A) and outputs the intrinsic and extrinsic camera parameters (e.g., camera position, focal length, and/or orientation parameters) 410A. In certain examples, the intrinsic and extrinsic camera parameters (e.g., camera position, focal length, and/or orientation parameters) 410A include one or any combination of sheer, scaling, and translation (e.g., "K") parameters, rotation (e.g., "R")

parameters, and/or center of the camera (e.g., X, Y, and Z coordinates) (e.g., "c") parameters. In certain examples this includes solving:

$$\min_{b \in \mathbb{R}^6} \|Ab\|_2$$

$$\text{Subject to } Cb = 0 \text{ and } \|b\|_2 = 1$$

where A may encode the homography and optical-center constraints and C may encode the no-skew and the aspect-ratio constraints. Let $C^\dagger$ comprise the basis of the null-space of C, then the above equation is equivalent to:

$$\min_{x \in \mathbb{R}^2} \|AC^\dagger x\|_2$$

$$\text{Subject to } \|x\|_2 = 1$$

The solution is the singular vector of the smallest singular value of $AC^\dagger$ and $b=C^\dagger x$.

Figure 8:
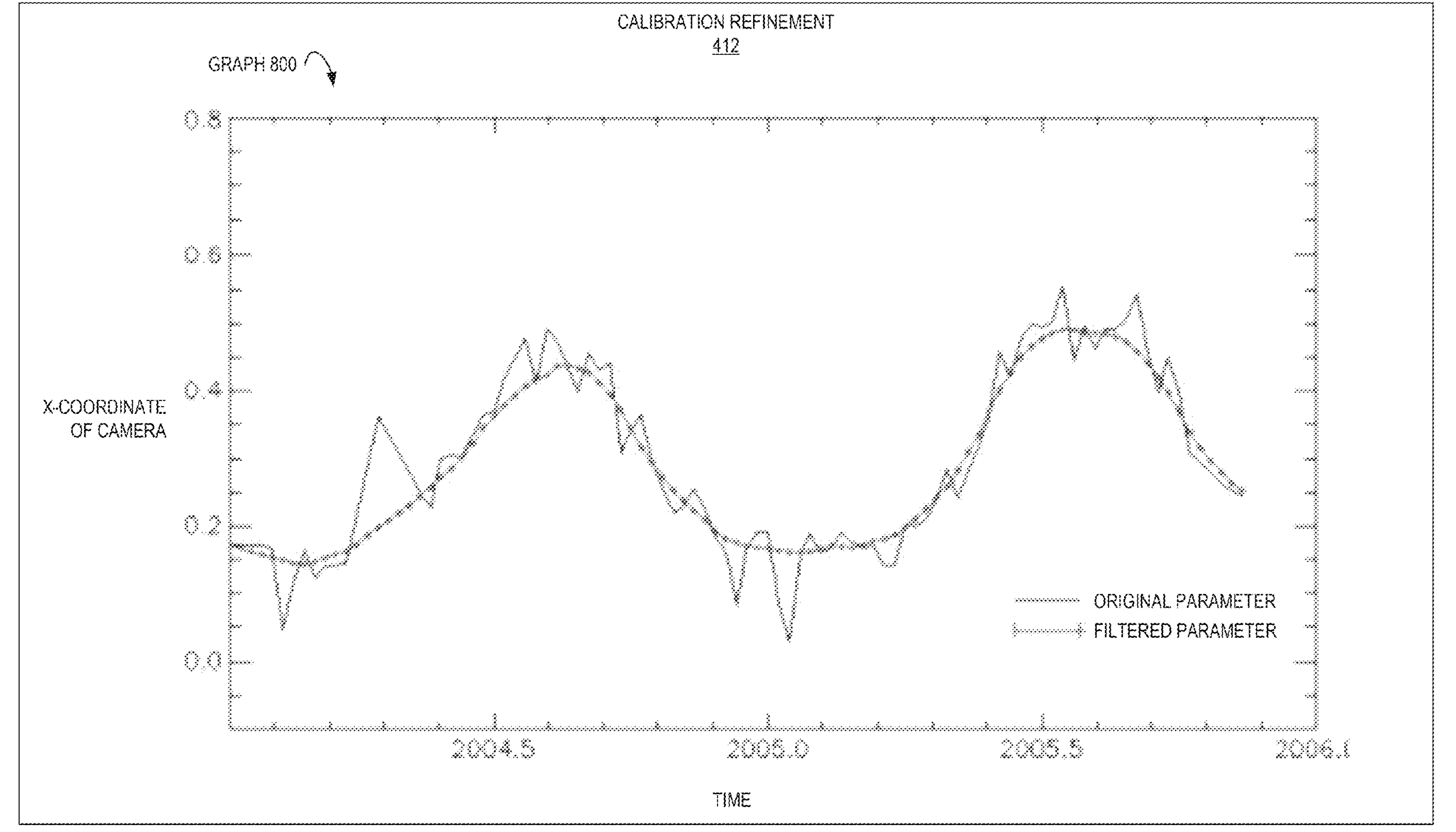
FIG. 8 is a graph of a camera position/orientation parameter before and after being refined by a calibration refinement of a graphic overlay service/system according to some examples.

In certain examples, graphic overlay service/system 106 (and/or 112) includes camera refinement (e.g., module) 412, e.g., that generates refined versions of intrinsic and extrinsic camera parameters (e.g., camera position, focal length, and/or orientation parameters) 410A (e.g., as shown in FIG. 8). In certain examples, camera refinement (e.g., module) 412 smooths the intrinsic and extrinsic camera parameters (e.g., camera position, focal length, and/or orientation parameters) across multiple frames.

In certain examples, graphic overlay service/system 106 (and/or 112) includes (e.g., three-dimension) graphic (e.g., and/or shadow) generation and/or insertion (e.g., module) 414, e.g., that generates a (e.g., three-dimensional) graphic 414A (e.g., three-dimensional graphic 902 and/or three-dimensional graphic 904 shown in FIG. 9). In certain examples, the graphic (e.g., and/or shadow) generation and/or insertion (e.g., module) 414 uses the intrinsic and extrinsic camera parameters (e.g., camera position, focal length, and/or orientation parameters) 410A to render consistent graphics and/or shadows (e.g., by (e.g., three-dimension) graphic (e.g., and shadow) generation/insertion 414), e.g., and blends the graphics and/or shadows with the frame 402 (e.g., plurality of frames forming a scene) according to the depth map 106B (e.g., using a mask) to generate output frame 418.

In certain examples, graphic overlay service/system 106 (and/or 112) includes (e.g., automatic) insertion (e.g., overlay) positioning (e.g., module) 416, e.g., that generates an indication to graphic (e.g., and/or shadow) generation and/or insertion (e.g., module) 414 on where to insert (e.g., overlay) graphic 414A.

In certain examples, graphic overlay service/system 106 (and/or graphic overlay service/system 112) receives an input image (e.g., video frame from live event 102), and initiates one or more (e.g., any combination) of the following operations: (i) surface (e.g., field) registration 404 is applied to estimate the mapping (e.g., homography 404A) between the image and the field template, (ii) (e.g., automatic) camera calibration 410 is performed in order to find the camera intrinsic and extrinsic parameters (e.g., using field registration, pan, tilt, and zoom (PTZ) data for the camera, or other algorithmic methods), (iii) the camera calibration 410 is refined and smoothed to avoid jitter in the video, (iv) (e.g., simultaneously), object (e.g., player) segmentation 406 is applied to find the pixels in the image representing players and/or other objects on the field, (v) depth model 106A for the image is calculated using the segmentation map 406A and the field registration (e.g., homography 404A) to create a pixel level depth map for the image, (vi) an (e.g., automatic) overlay positioning 416 uses the depth map 106B to locate a vacant field position to position the overlay, for example, according to predefined attributes (e.g., display (e.g., screen) size and position, distance from players, etc.), (vi) desired three-dimensional overlay is generated (e.g., rendered), at block 414, according to the camera parameters and the desired overlay position, and/or (vii) the three-dimensional overlay image is blended, at block 414, with the input image using the calculated depth map 106B to generate output image 418.

In order to create an authentic viewing experience featuring three-dimensional overlays, in certain examples it is crucial to position it in a vacant space to avoid actual objects (e.g., players and ball) passing through the overlay (e.g., hologram) and discrediting its reliability. In certain examples, (e.g., automatic) insertion (e.g., overlay) positioning (e.g., module) 416 finds one or more optimal locations for graphic placement. In certain examples, (e.g., automatic) insertion (e.g., overlay) positioning (e.g., module) 416 evaluates positions on the field according to one or more (e.g., any combination of): (i) vacancy, for example, the position of players and ball may be extracted either from the depth model or from positioning sensors on the players and ball (e.g., from the Next Gen Stats (NGS) for American Football), (ii) visibility, for example, the overlay is to be included in the frustum of the camera, with predefined size and symmetry with respect to the final output image, and/or (iii) effect on gameplay, for example, the overlay is to be non-obstructing for gameplay (e.g., avoid blocking the players during game action). In certain examples, (e.g., automatic) insertion (e.g., overlay) positioning (e.g., module) 416 uses the foregoing criteria to select the most appropriate field position and timing for placing a three-dimensional graphic.

Figure 5:
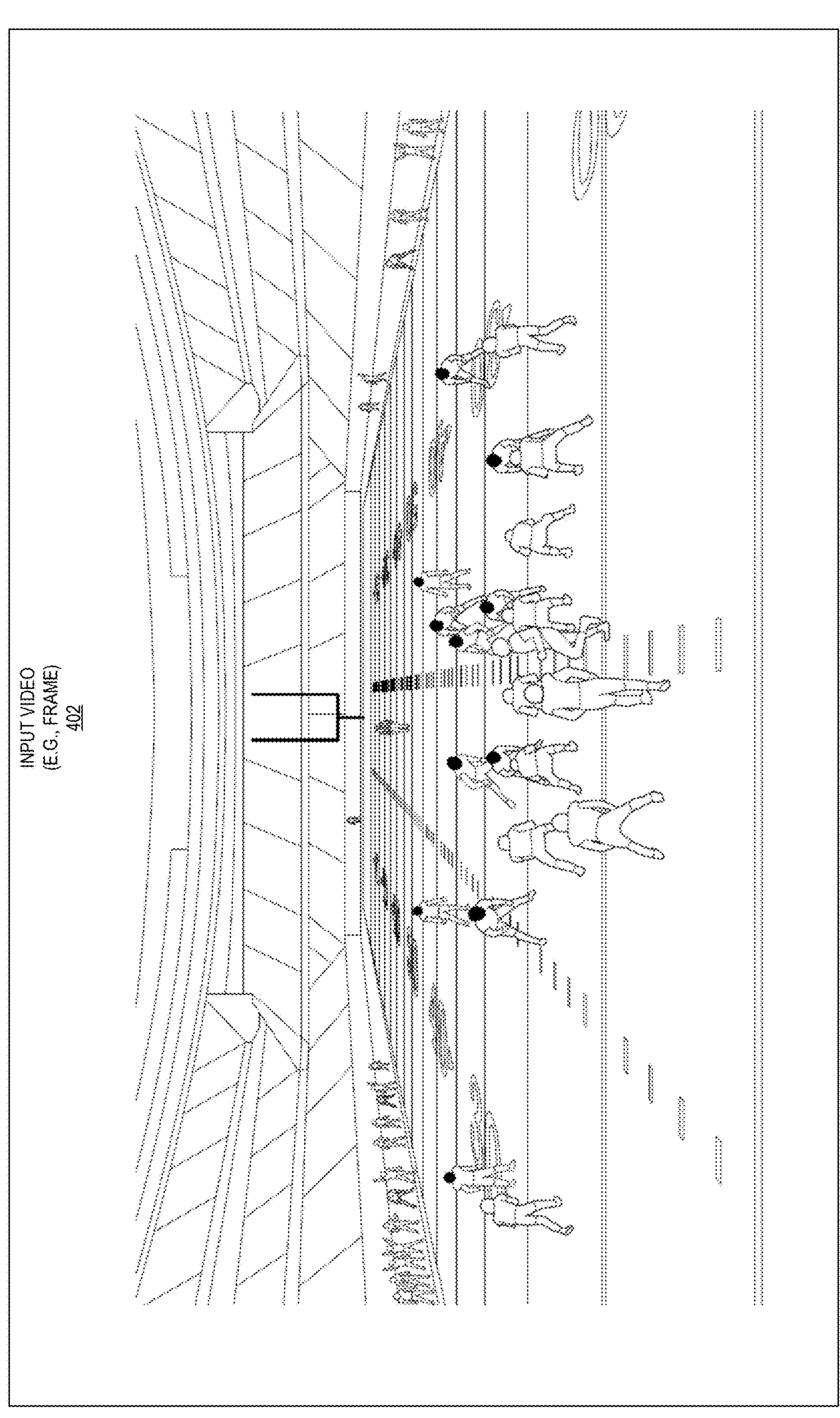
FIG. 5 is a diagram illustrating an input video frame, that depicts a two-dimensional playing surface of a football game, for a graphic overlay service/system according to some examples.

FIG. 5 is a diagram illustrating an input video frame 402, that depicts a two-dimensional playing surface of a football game, for a graphic overlay service/system according to some examples. Input video frame 402 is shown as a black and white line drawing, but it should be understood that it can be a colored image (e.g., frame) (e.g., at a video resolution).

Figure 6:
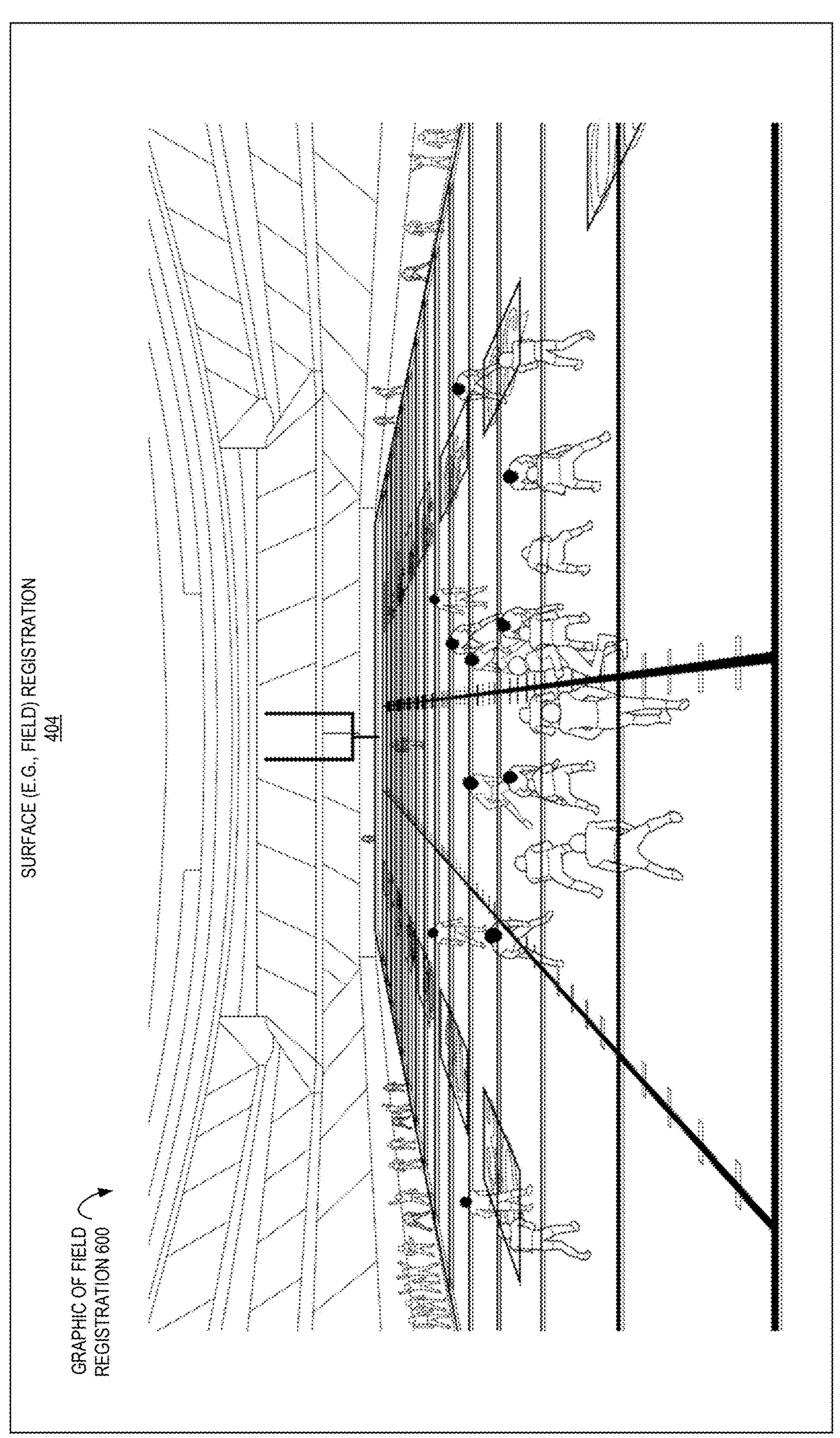
FIG. 6 is a diagram illustrating a graphic of a field registration (shown as bold lines) for the two-dimensional playing surface of the football game in FIG. 5 generated by a surface registration of a graphic overlay service/system according to some examples.

FIG. 6 is a diagram illustrating a graphic 600 of a field registration (shown as bold lines) for the two-dimensional playing surface of the football game in FIG. 5 generated by a surface registration of a graphic overlay service/system according to some examples. In certain examples, the field registration (e.g., homography 404A) is generated by surface (e.g., field) registration 404 in FIG. 4.

Figure 7:
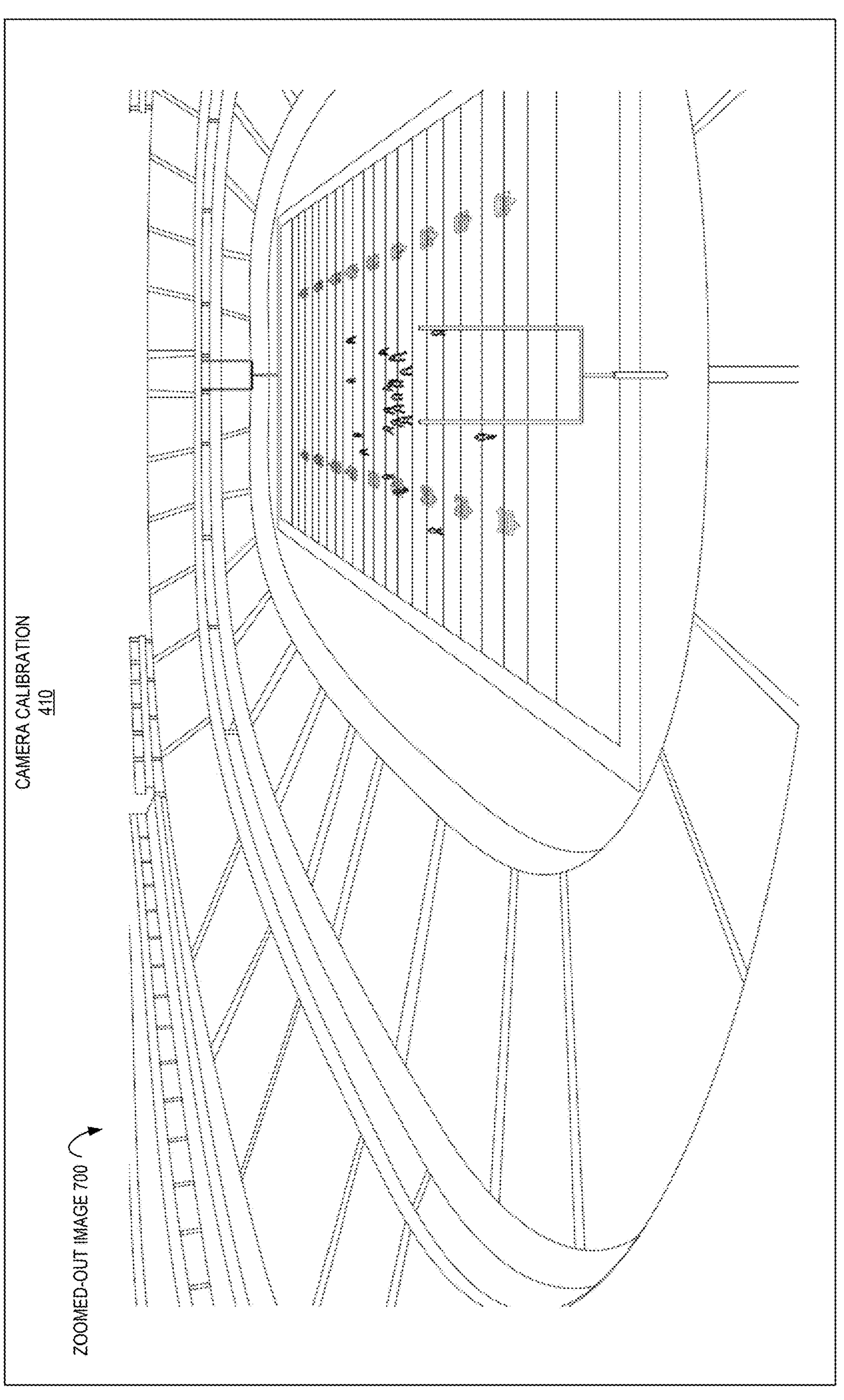
FIG. 7 is a diagram illustrating zoomed-out image from a camera in a football stadium according to some examples.

FIG. 7 is a diagram illustrating zoomed-out image 700 from a camera in a football stadium according to some examples. Image 700 is used to show that a camera may be relatively far from a playing surface, and can pan, tilt, and/or zoom, so in certain examples, camera calibration 410 is used to determine intrinsic and extrinsic camera parameters (e.g., camera position, focal length, and/or orientation parameters) 410A, e.g., as used by graphic overlay service/system 106 (e.g., depth model).

FIG. 8 is a graph 800 of a camera position/orientation parameter (e.g., X-coordinate of a camera position) along multiple frames (shown as time for each frame) before (e.g., original parameter) and after (e.g., filtered parameter) being refined by a calibration refinement 412 of a graphic overlay service/system according to some examples.

FIG. 9 is a diagram illustrating a first three-dimensional graphic 902 and a second three-dimensional graphic 904 of a set of graphics 414A to be used (e.g., and generated) by a graphic overlay service/system according to some examples. In certain examples, the graphic 902 and/or graphic 904 is generated by graphic (e.g., and/or shadow) generation and/or insertion (e.g., module) 414. In certain examples, graphic 902 includes a shadow 902-S (shown with a dotted box for emphasis) and/or graphic 904 includes a shadow 904-S (shown with a dotted box for emphasis). In certain examples, a shadow is generated based on the lighting of a scene (e.g., frame).

FIG. 10 is a diagram illustrating a segmentation map 406A for the people depicted in the frame 402 in FIG. 5 generated by object (e.g., people) detection and/or segmentation 406 of a graphic overlay service/system according to some examples.

In certain examples, the one or more (e.g., ensemble of) ML models includes a depth model to generate a depth map 106B for objects. In certain examples, a depth model is computed based on the field registration (e.g., homography 404A) and object (e.g., player) segmentation map 406A. In certain examples, for each pixel classified as "field" (e.g., by the segmentation map 406A), the appropriate two-dimensional position on the field template (e.g., shown in FIG. 6) is directly calculated using the field homography 404A. In certain examples, for player pixels, the graphic overlay service/system (e.g., depth model) finds the lowest pixel of each player (e.g., a foot, or other part of the player, relatively close to the ground).

FIG. 11 is a diagram illustrating the lowest pixel in a first object 1100 (e.g., person) depicted in the frame 402 in FIG. 5 according to some examples.

In certain examples, for player pixels, the graphic overlay service/system (e.g., depth model) uses the lowest pixel of each player and the homography 404A to find the two-dimensional position of this pixel on the field template, and applies the same position for all of the player's pixels. In certain examples, applying such a "cardboard cutout" model assumes that each player has a singular, point-like position on the field, yet this is an accurate approximation for blending overlays (e.g., overlays that are not in direct contact with the players).

FIG. 12 is a diagram illustrating a depth map 1200 of the lowest pixel (e.g., where the position of the lowest pixel for each player is applied to a plurality of (e.g., all) pixels of a corresponding player to generate the depth map for each of the objects (e.g., people)) and the field depicted in the frame in FIG. 5 according to some examples. In certain examples, depth map 1200 is used to generate and/or insert graphics by the graphic overlay service/system. In certain examples, depth map 1200 presumes each player has a single depth. FIG. 12 includes a depth map 1200 that illustrates the variance of the representative color of an object from closest to the camera (e.g., shown as purple at zero meters per the legend) to furthest from the camera (e.g., shown as yellow at sixty meters per the legend).

Figure 13:
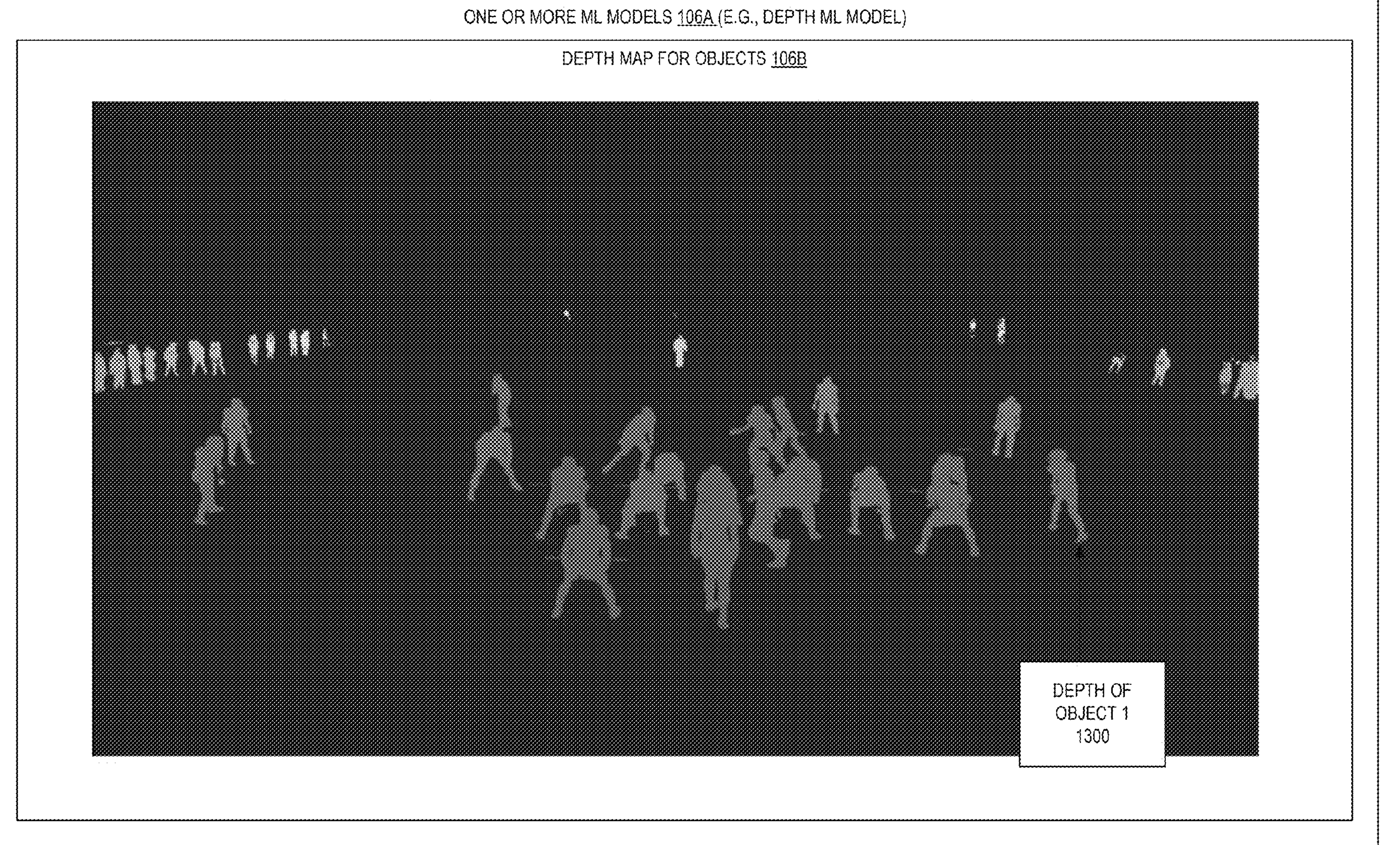
FIG. 13 is a diagram illustrating a depth map of only the objects (e.g., people) depicted in the frame in FIG. 5 according to some examples.

FIG. 13 is a diagram illustrating a depth map 1300 of only the objects (e.g., people) depicted in the frame in FIG. 5 according to some examples. In certain examples, the field is masked out using the object (e.g., player) segmentation map 406A to generate the depth map 1300. In certain examples, depth map 1300 is used to generate and/or insert graphics by the graphic overlay service/system. In certain examples, the lighter color of the player indicates the player is further from the camera (e.g., is "deeper"). In certain examples, depth map 1300 presumes each player has a single depth. Depth of object 1 1300 (e.g., player) is shown as a uniform depth according to the "cardboard cutout" model, even though in actuality the player is not of a single depth owing to their three-dimensional nature.

FIG. 14 is a diagram illustrating an output frame 418 generated by inserting (e.g., overlaying) (e.g., immediately prior to a snap of the ball to begin play) the first three-dimensional graphic 902 and the second three-dimensional graphic 904 in FIG. 9 into the input video frame of FIG. 5 according to a depth map by a graphic overlay service/system according to some examples. Particularly, in the depicted output frame 418, the first three-dimensional graphic 902 and the second three-dimensional graphic 904 are inserted onto the playing surface while occluding certain people on the sidelines, but not occluding any of the 11 players on the field for each team (i.e., 22 players total on the field) where frame 418 depicts a three-dimensional scene, e.g., having (X, Y, Z) axes depicted in FIG. 14 (e.g., but not included in the output video/frame 418) with the X-axis extending the length of the field, the Y-axis extending the width of the field, and the Z-axis extending above (and below) the field.

Figure 15:
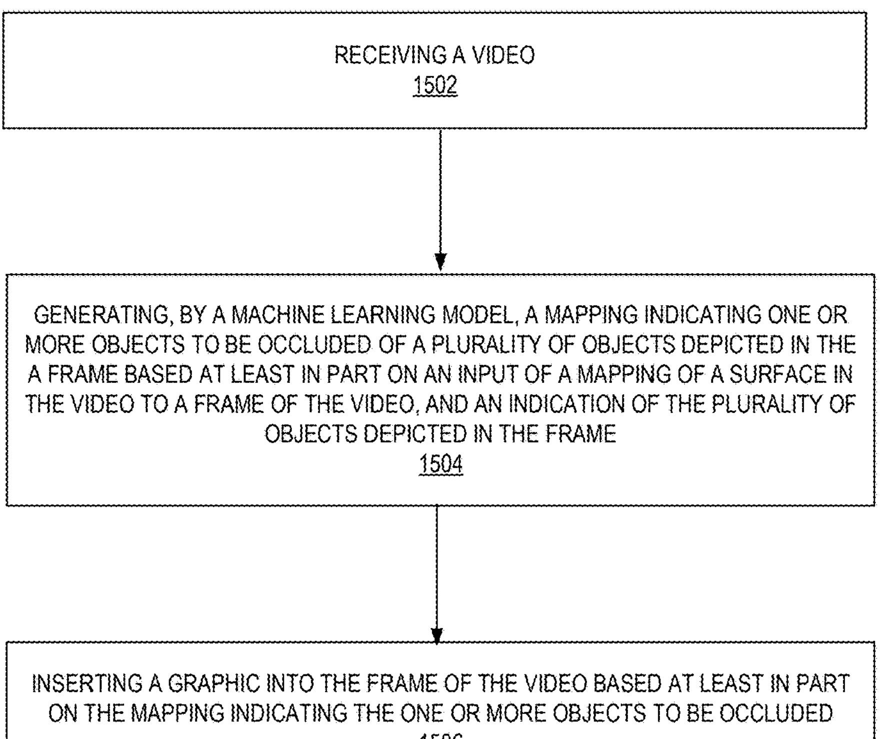
FIG. 15 is a flow diagram illustrating operations of a method of inserting a graphic into a video according to a depth map generated by a machine learning model according to some examples.

FIG. 15 is a flow diagram illustrating operations 1500 of a method of inserting a graphic into a video according to a depth map generated by a machine learning model according to some examples. Some or all of the operations 1500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1500 are performed by a graphic overlay service/system of the other figures (e.g., implemented in production service/system 108 or 114).

The operations 1500 include, at block 1502, receiving a video. The operations 1500 further include, at block 1504, generating, by a machine learning model, a mapping indicating one or more objects to be occluded of a plurality of objects depicted in a frame based at least in part on an input of a mapping of a surface in the video to a frame of the video, and an indication of the plurality of objects depicted in the frame. The operations 1500 further include, at block 1506, inserting a graphic into the frame of the video based at least in part on the mapping indicating the one or more objects to be occluded.

At least some examples of the disclosed technologies can be described in view of the following examples:

Example 1. A computer-implemented method comprising:

receiving a live stream of a sporting event;

determining a mapping of a playing surface of the sporting event depicted in the live stream to a frame of the live stream;

generating, by a machine learning model, a depth map indicating a corresponding depth for an individual player of a plurality of players depicted in the frame based at least in part on an input of the mapping and an indication of the plurality of players depicted in the frame; and inserting a graphic into the frame of the live stream based at least in part on the depth map.

Example 2. The computer-implemented method of example 1, wherein the indication comprises a player segmentation map, and the generating comprises:

determining a pixel of the individual player of the plurality of players depicted in the frame that is closest to the playing surface;

determining a position of the pixel for the individual player from the mapping; and applying the position of the pixel for the individual player to a plurality of pixels of a corresponding player indicated by the player segmentation map to generate the depth map.

Example 3. The computer-implemented method of example 1, wherein the inserting comprises occluding a first set of one or more players of the plurality of players on the playing surface based at least in part on the depth map, and not occluding a second set of one or more players of the plurality of players on the playing surface based at least in part on the depth map.

Example 4. A computer-implemented method comprising:

receiving a video;

generating, by a machine learning model, a mapping indicating one or more objects to be occluded of a plurality of objects depicted in a frame based at least in part on an input of a mapping of a surface in the video to a frame of the video, and an indication of the plurality of objects depicted in the frame; and inserting a graphic into the frame of the video based at least in part on the mapping indicating the one or more objects to be occluded.

Example 5. The computer-implemented method of example 4, wherein the indication comprises an object segmentation map, and the generating comprises:

determining a pixel of an individual object of the plurality of objects depicted in the frame that is closest to the surface;

determining a position of the pixel for the individual object from the mapping; and applying the position of the pixel for the individual object to a plurality of pixels of a corresponding object indicated by the object segmentation map to generate the mapping indicating the one or more objects to be occluded.

Example 6. The computer-implemented method of example 4, wherein the mapping of the surface in the frame of the video to the frame of the video comprises a homography.

Example 7. The computer-implemented method of example 6, further comprising:

determining a first set of intrinsic and extrinsic camera parameters from the homography for the frame; and generating the graphic for the frame based at least in part on the first set of intrinsic and extrinsic camera parameters.

Example 8. The computer-implemented method of example 7, wherein the generating the graphic for the frame is also based at least in part on a desired position for the graphic.

Example 9. The computer-implemented method of example 7, further comprising:

determining a second set of intrinsic and extrinsic camera parameters for a second frame of the video; and performing a refinement of the first set of intrinsic and extrinsic camera parameters based at least in part on the second set of intrinsic and extrinsic camera parameters.

Example 10. The computer-implemented method of example 4, wherein the inserting comprises a depth-based object layering based at least in part on the mapping indicating the one or more objects to be occluded.

Example 11. The computer-implemented method of example 10, wherein the depth-based object layering comprises not occluding a first set of one or more of the objects on the surface based at least in part on the mapping indicating the one or more objects to be occluded, and occluding a second set of one or more of the objects on the surface based at least in part on the mapping indicating the one or more objects to be occluded.

Example 12. The computer-implemented method of example 4, wherein the inserting inserts the graphic into a portion of the frame that does not include an object of the plurality of objects.

Example 13. The computer-implemented method of example 4, wherein the inserting is according to a predefined attribute.

Example 14. The computer-implemented method of example 4, wherein the graphic is a three-dimensional animation.

Example 15. A non-transitory computer-readable medium storing code that, when executed by a device, causes the device to perform a method comprising:

receiving a video;

generating, by a machine learning model, a mapping indicating one or more objects to be occluded of a plurality of objects depicted in a frame based at least in part on an input of a mapping of a surface in the video to a frame of the video, and an indication of the plurality of objects depicted in the frame; and inserting a graphic into the frame of the video based at least in part on the mapping indicating the one or more objects to be occluded.

Example 16. The non-transitory computer-readable medium of example 15, wherein the indication comprises an object segmentation map, and the generating comprises:

determining a pixel of an individual object of the plurality of objects depicted in the frame that is closest to the surface;

determining a position of the pixel for the individual object from the mapping; and applying the position of the pixel for the individual object to a plurality of pixels of a corresponding object indicated by the object segmentation map to generate the mapping indicating the one or more objects to be occluded.

Example 17. The non-transitory computer-readable medium of example 15, wherein the inserting comprises a depth-based object layering based at least in part on the mapping indicating the one or more objects to be occluded.

Example 18. The non-transitory computer-readable medium of example 17, wherein the depth-based object layering comprises not occluding a first set of one or more of the objects on the surface based at least in part on the mapping indicating the one or more objects to be occluded, and occluding a second set of one or more of the objects on the surface based at least in part on the mapping indicating the one or more objects to be occluded.

Example 19. The non-transitory computer-readable medium of example 15, wherein the inserting is according to a predefined attribute.

Example 20. The non-transitory computer-readable medium of example 19, wherein the graphic is a three-dimensional animation.

Exemplary environments, systems, etc. that the above may be used in are detailed below.

Figure 16:
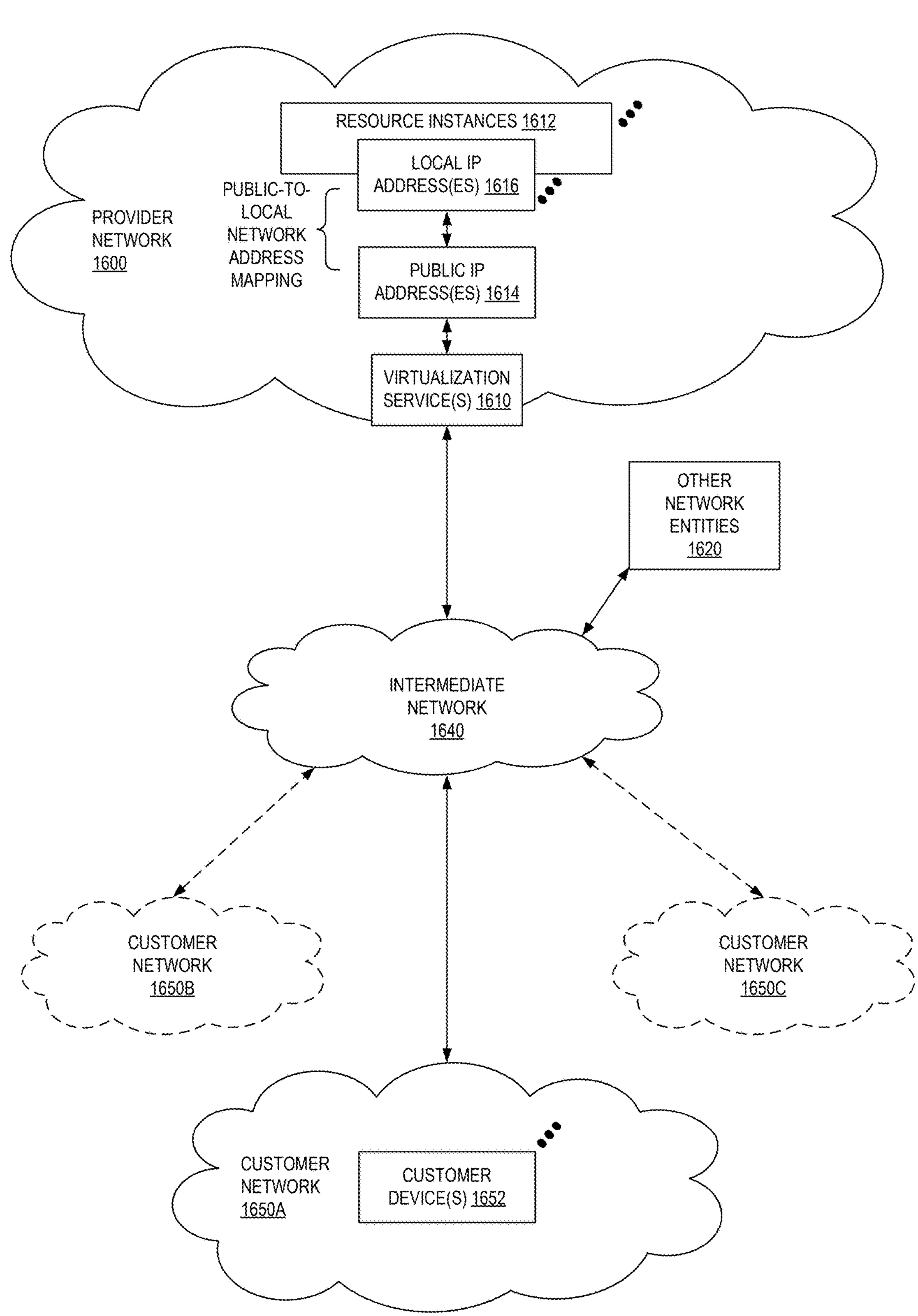
FIG. 16 illustrates an example provider network environment according to some examples.

FIG. 16 illustrates an example provider network (or "service provider system") environment according to some examples. A provider network 1600 may provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 may be associated with the resource instances 1612; the local IP addresses are the internal network addresses of the resource instances 1612 on the provider network 1600. In some examples, the provider network 1600 may also provide public IP addresses 1614 and/or public IP address ranges (e.g., Internet Protocol version 4 (IPv4) or Internet Protocol version 6 (IPv6) addresses) that customers may obtain from the provider 1600.

Conventionally, the provider network 1600, via the virtualization services 1610, may allow a customer of the service provider (e.g., a customer that operates one or more client networks 1650A-1650C including one or more customer device(s) 1652) to dynamically associate at least some public IP addresses 1614 assigned or allocated to the customer with particular resource instances 1612 assigned to the customer. The provider network 1600 may also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of customer network(s) 1650A-1650C may, for example, implement customer-specific applications and present the customer's applications on an intermediate network 1640, such as the Internet. Other network entities 1620 on the intermediate network 1640 may then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 may be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1600; a customer may then assign their allocated public IP addresses to particular resource instances allocated to the customer. These public IP addresses may be referred to as customer public IP addresses, or simply customer IP addresses. Instead of being assigned by the provider network 1600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
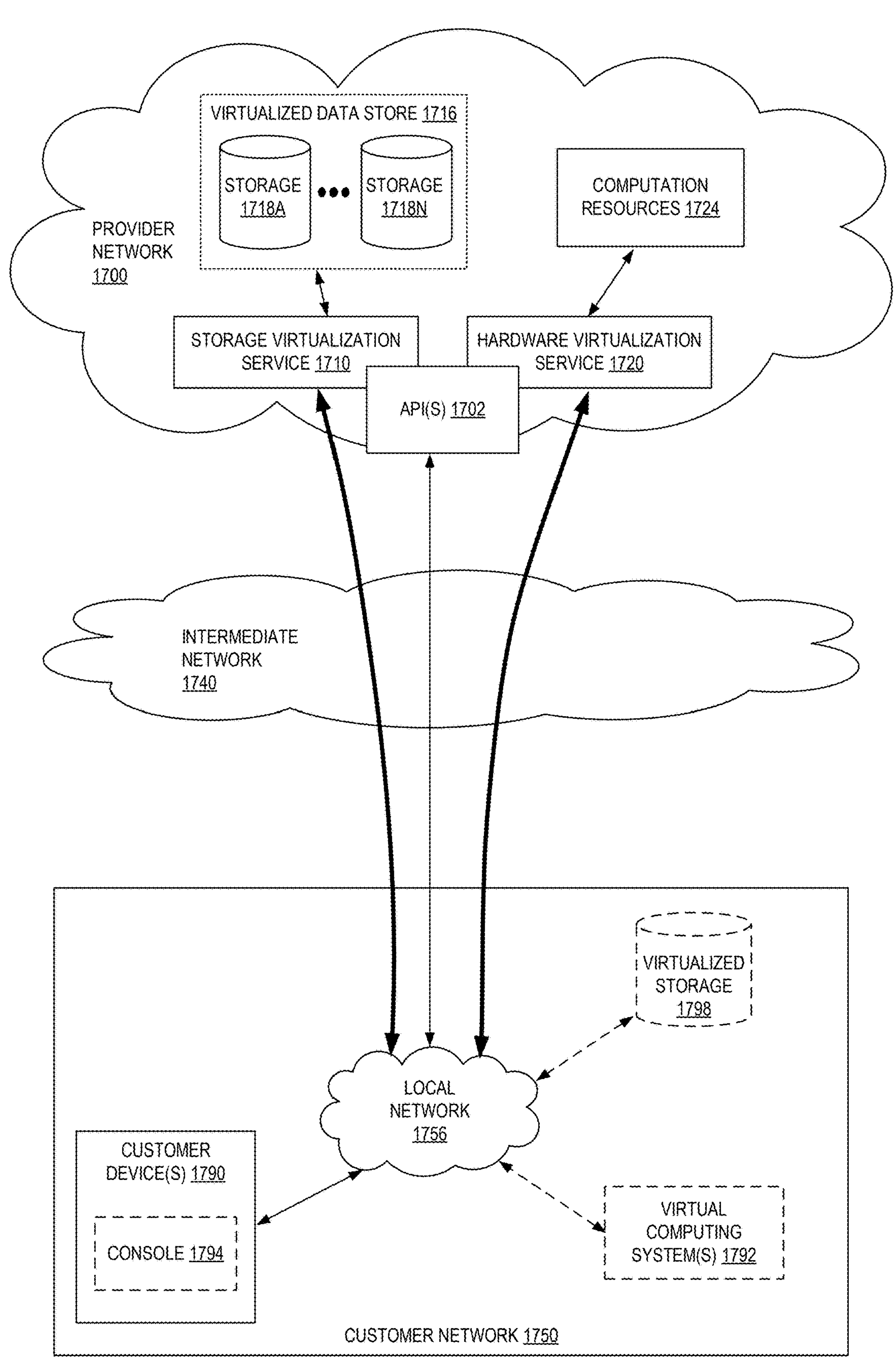
FIG. 17 is a block diagram of an example provider network that provides a storage service and a hardware virtualization service to customers according to some examples.

FIG. 17 is a block diagram of an example provider network that provides a storage service and a hardware virtualization service to customers, according to some examples. Hardware virtualization service 1720 provides multiple computation resources 1724 (e.g., VMs) to customers. The computation resources 1724 may, for example, be rented or leased to customers of the provider network 1700 (e.g., to a customer that implements customer network 1750). Each computation resource 1724 may be provided with one or more local IP addresses. Provider network 1700 may be configured to route packets from the local IP addresses of the computation resources 1724 to public Internet destinations, and from public Internet sources to the local IP addresses of computation resources 1724.

Provider network 1700 may provide a customer network 1750, for example coupled to intermediate network 1740 via local network 1756, the ability to implement virtual computing systems 1792 via hardware virtualization service 1720 coupled to intermediate network 1740 and to provider network 1700. In some examples, hardware virtualization service 1720 may provide one or more APIs 1702, for example a web services interface, via which a customer network 1750 may access functionality provided by the hardware virtualization service 1720, for example via a console 1794 (e.g., a web-based application, standalone application, mobile application, etc.). In some examples, at the provider network 1700, each virtual computing system 1792 at customer network 1750 may correspond to a computation resource 1724 that is leased, rented, or otherwise provided to customer network 1750.

From an instance of a virtual computing system 1792 and/or another customer device 1790 (e.g., via console 1794), the customer may access the functionality of storage service 1710, for example via one or more APIs 1702, to access data from and store data to storage resources 1718A-1718N of a virtual data store 1716 (e.g., a folder or "bucket", a virtualized volume, a database, etc.) provided by the provider network 1700. In some examples, a virtualized data store gateway (not shown) may be provided at the customer network 1750 that may locally cache at least some data, for example frequently-accessed or critical data, and that may communicate with storage service 1710 via one or more communications channels to upload new or modified data from a local cache so that the primary store of data (virtualized data store 1716) is maintained. In some examples, a user, via a virtual computing system 1792 and/or on another customer device 1790, may mount and access virtual data store 1716 volumes via storage service 1710 acting as a storage virtualization service, and these volumes may appear to the user as local (virtualized) storage 1798.

While not shown in FIG. 17, the virtualization service(s) may also be accessed from resource instances within the provider network 1700 via API(s) 1702. For example, a customer, appliance service provider, or other entity may access a virtualization service from within a respective virtual network on the provider network 1700 via an API 1702 to request allocation of one or more resource instances within the virtual network or within another virtual network.

Illustrative System

Figure 18:
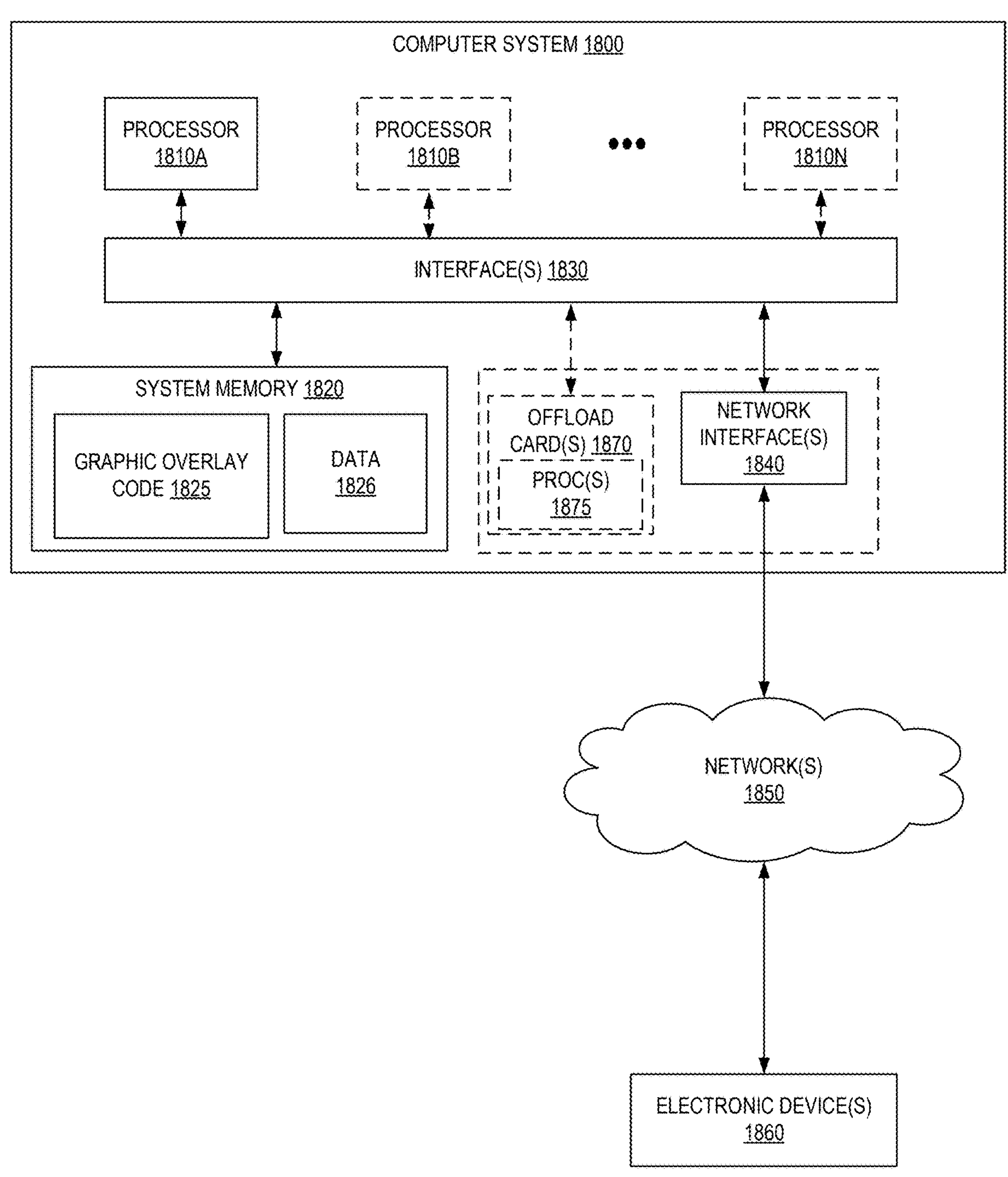
FIG. 18 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1800 illustrated in FIG. 18. In the illustrated example, computer system 1800 includes one or more processors 1810 coupled to a system memory 1820 via an input/output (I/O) interface 1830. Computer system 1800 further includes a network interface 1840 coupled to I/O interface 1830. While FIG. 18 shows computer system 1800 as a single computing device, in various examples a computer system 1800 may include one computing device or any number of computing devices configured to work together as a single computer system 1800.

In various examples, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various examples, processors 1810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1810 may commonly, but not necessarily, implement the same ISA.

System memory 1820 may store instructions and data accessible by processor(s) 1810. In various examples, system memory 1820 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1820 as graphic overlay code 1825 (e.g., executable to implement, in whole or in part, the operations discussed herein) and data 1826.

In one example, I/O interface 1830 may be configured to coordinate I/O traffic between processor 1810, system memory 1820, and any peripheral devices in the device, including network interface 1840 or other peripheral interfaces. In some examples, I/O interface 1830 may perform any necessary protocol, timing, or other data transformations to convert data signals from one component (e.g., system memory 1820) into a format suitable for use by another component (e.g., processor 1810). In some examples, I/O interface 1830 may include support for devices attached through various types of peripheral buses, such as a variant of the Peripheral Component Interconnect (PCI) bus standard or the Universal Serial Bus (USB) standard, for example. In some examples, the function of I/O interface 1830 may be split into two or more separate components, such as a north bridge and a south bridge, for example. Also, in some examples some or all of the functionality of I/O interface 1830, such as an interface to system memory 1820, may be incorporated directly into processor 1810.

Network interface 1840 may be configured to allow data to be exchanged between computer system 1800 and other devices 1860 attached to a network or networks 1850, such as other computer systems or devices as illustrated in FIG. 1, for example. In various examples, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1800 includes one or more offload cards 1870 (including one or more processors 1875, and possibly including the one or more network interfaces 1840) that are connected using an I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1800 may act as a host electronic device (e.g., operating as part of a hardware virtualization service) that hosts compute instances, and the one or more offload cards 1870 execute a virtualization manager that can manage compute instances that execute on the host electronic device. As an example, in some examples the offload card(s) 1870 can perform compute instance management operations such as pausing and/or un-pausing compute instances, launching and/or terminating compute instances, performing memory transfer/copying operations, etc. These management operations may, in some examples, be performed by the offload card(s) 1870 in coordination with a hypervisor (e.g., upon a request from a hypervisor) that is executed by the other processors 1810A-1810N of the computer system 1800. However, in some examples the virtualization manager implemented by the offload card(s) 1870 can accommodate requests from other entities (e.g., from compute instances themselves), and may not coordinate with (or service) any separate hypervisor.

In some examples, system memory 1820 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1800 via I/O interface 1830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1800 as system memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840.

Figure 19:
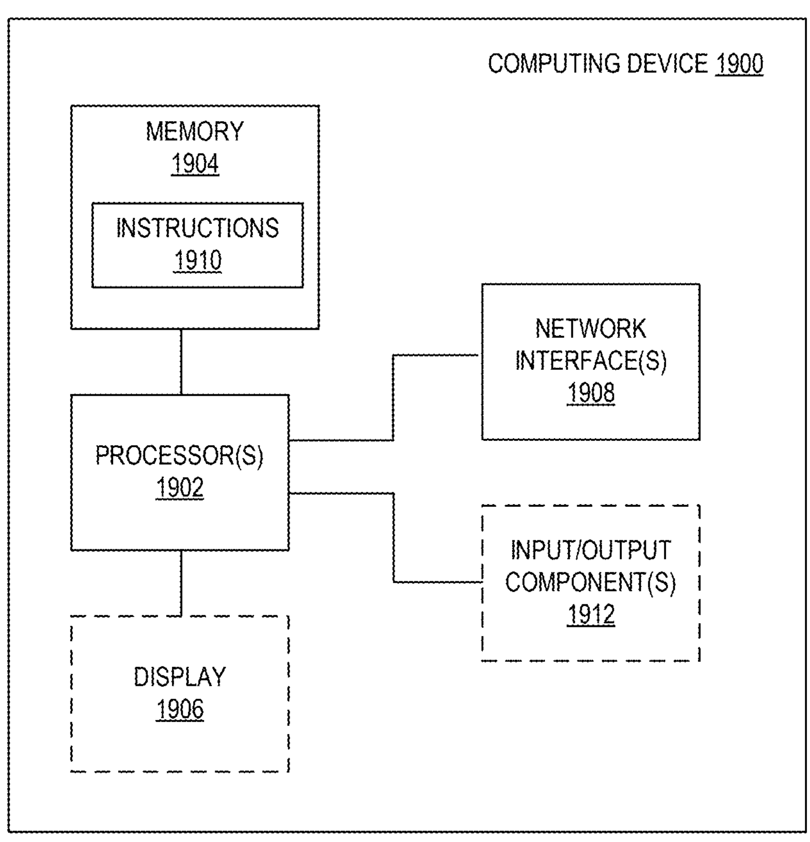
FIG. 19 illustrates a logical arrangement of a set of general components of an exemplary computing device that can be utilized in accordance with various examples.

FIG. 19 illustrates a logical arrangement of a set of general components of an example computing device 1900. Generally, a computing device 1900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1904) to store code (for example, instructions 1910, e.g., which implement a content delivery service as disclosed herein), and a set of one or more wired or wireless network interfaces 1908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1904) of a given electronic device typically stores code (e.g., instructions 1910) for execution on the set of one or more processors 1902 of that electronic device. One or more parts of various examples may be implemented using different combinations of software, firmware, and/or hardware.

A computing device 1900 can include some type of display element 1906, such as a touch screen or liquid crystal display (LCD), although many devices such as portable media players might convey information via other means, such as through audio speakers, and other types of devices such as server end stations may not have a display element 1906 at all. As discussed, some computing devices used in some examples include at least one input and/or output component(s) 1912 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 20:
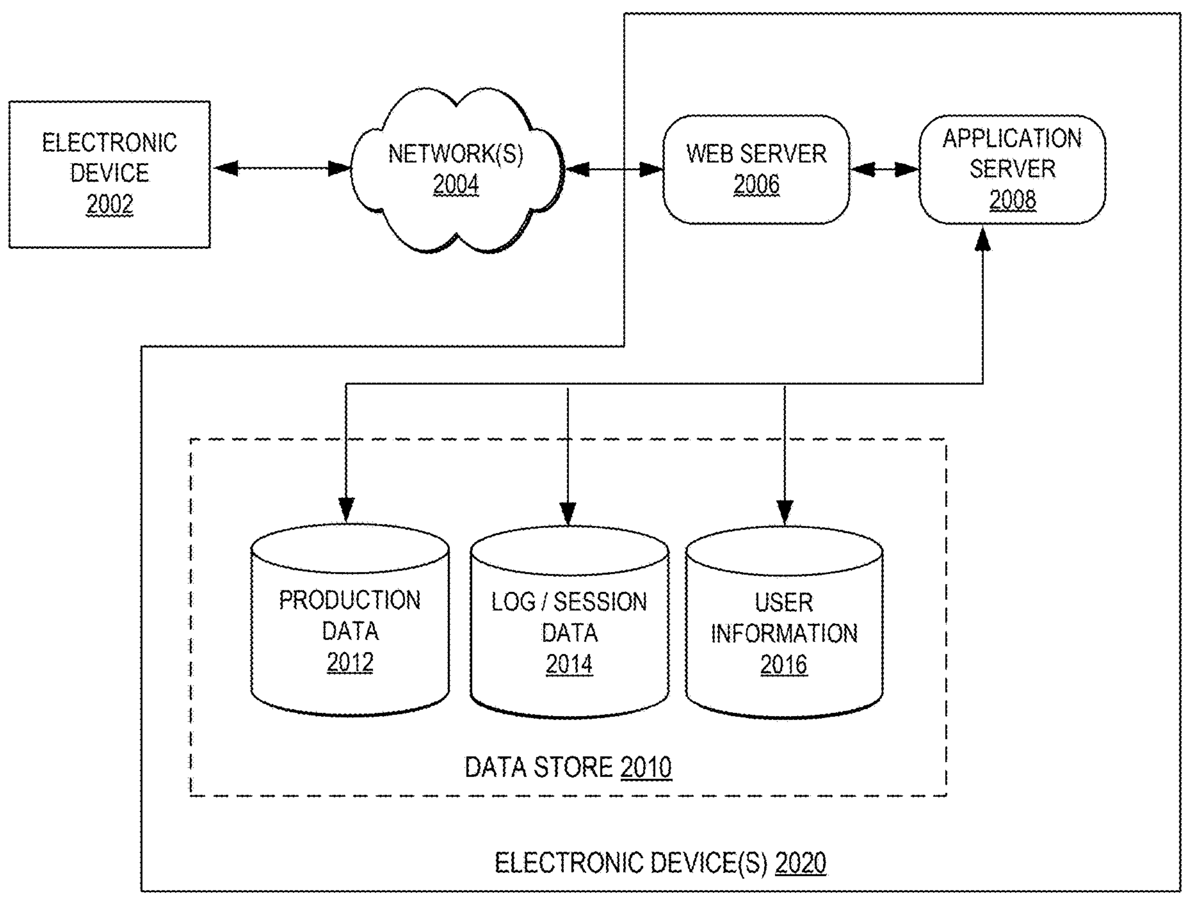
FIG. 20 illustrates an example of an environment for implementing aspects in accordance with various examples.

As discussed, different approaches can be implemented in various environments in accordance with the described examples. For example, FIG. 20 illustrates an example of an environment 2000 for implementing aspects in accordance with various examples. For example, in some examples messages are HyperText Transfer Protocol (HTTP) requests that are received by a web server (e.g., web server 2006), and the users, via electronic devices, may interact with the provider network via a web portal provided via the web server 2006 and application server 2008. As will be appreciated, although a web-based environment is used for purposes of explanation, different environments may be used, as appropriate, to implement various examples. The system includes an electronic client device 2002, which may also be referred to as a client device and can be any appropriate device operable to send and receive requests, messages, or information over an appropriate network 2004 and convey information back to a user of the device 2002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2004 includes the Internet, as the environment includes a web server 2006 for receiving requests and serving content in response thereto, although for other networks an alternative device serving a similar purpose could be used, as would be apparent to one of ordinary skill in the art.

The illustrative environment includes at least one application server 2008 and a data store 2010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 2008 can include any appropriate hardware and software for integrating with the data store 2010 as needed to execute aspects of one or more applications for the client device 2002 and handling a majority of the data access and business logic for an application. The application server 2008 provides access control services in cooperation with the data store 2010 and is able to generate content such as text, graphics, audio, video, etc., to be transferred to the client device 2002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2002 and the application server 2008, can be handled by the web server 2006. It should be understood that the web server 2006 and application server 2008 are not required and are merely example components, as structured code discussed herein can be executed on any appropriate device or host machine as discussed elsewhere herein.

The data store 2010 can include several separate data tables, databases, or other data storage mechanisms and media for storing data relating to a particular aspect. For example, the data store illustrated includes mechanisms for storing production data 2012 and user information 2016, which can be used to serve content for the production side. The data store 2010 also is shown to include a mechanism for storing log or session data 2014. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. In one example, a user might submit a search request for a certain type of item. In this case, the data store 2010 might access the user information 2016 to verify the identity of the user and can access a production data 2012 to obtain information about items of that type. The information can then be returned to the user, such as in a listing of results on a web page that the user is able to view via a browser on the user device 2002. Information for a particular item of interest can be viewed in a dedicated page or window of the browser.

The web server 2006, application server 2008, and/or data store 2010 may be implemented by one or more electronic devices 2020, which can also be referred to as electronic server devices or server end stations, and may or may not be located in different geographic locations. Each of the one or more electronic devices 2020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the environment 2000 in FIG. 20 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1718A-1718N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "a certain example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving a live stream of a sporting event;

determining a mapping of a playing surface of the sporting event depicted in the live stream to a frame of the live stream;

generating, by a machine learning model, a depth map indicating a corresponding depth for an individual player of a plurality of players depicted in the frame based at least in part on an input of the mapping and an indication of the plurality of players depicted in the frame; and inserting a three-dimensional graphic into the frame of the live stream based at least in part on the depth map.

2. The computer-implemented method of claim 1, wherein the indication comprises a player segmentation map, and the generating comprises:

determining a pixel of the individual player of the plurality of players depicted in the frame that is closest to the playing surface;

determining a position of the pixel for the individual player from the mapping; and applying the position of the pixel for the individual player to a plurality of pixels of a corresponding player indicated by the player segmentation map to generate the depth map.

3. The computer-implemented method of claim 1, wherein the inserting comprises occluding a first set of one or more players of the plurality of players on the playing surface based at least in part on the depth map, and not occluding a second set of one or more players of the plurality of players on the playing surface based at least in part on the depth map.

4. A computer-implemented method comprising:

receiving a video;

generating, by a machine learning model, a mapping indicating one or more objects to be occluded of a plurality of objects depicted in a frame based at least in part on an input of a mapping of a surface in the video to a frame of the video, and an indication of the plurality of objects depicted in the frame; and inserting a graphic into the frame of the video based at least in part on the mapping indicating the one or more objects to be occluded.

5. The computer-implemented method of claim 4, wherein the indication comprises an object segmentation map, and the generating comprises:

determining a pixel of an individual object of the plurality of objects depicted in the frame that is closest to the surface;

determining a position of the pixel for the individual object from the mapping; and applying the position of the pixel for the individual object to a plurality of pixels of a corresponding object indicated by the object segmentation map to generate the mapping indicating the one or more objects to be occluded.

6. The computer-implemented method of claim 4, wherein the mapping of the surface in the frame of the video to the frame of the video comprises a homography.

7. The computer-implemented method of claim 6, further comprising:

determining a first set of intrinsic and extrinsic camera parameters from the homography for the frame; and generating the graphic for the frame based at least in part on the first set of intrinsic and extrinsic camera parameters.

8. The computer-implemented method of claim 7, wherein the generating the graphic for the frame is also based at least in part on a desired position for the graphic.

9. The computer-implemented method of claim 7, further comprising:

determining a second set of intrinsic and extrinsic camera parameters for a second set of one or more frames of the video; and performing a refinement of the first set of intrinsic and extrinsic camera parameters based at least in part on the second set of intrinsic and extrinsic camera parameters.

10. The computer-implemented method of claim 4, wherein the inserting comprises a depth-based object layering based at least in part on the mapping indicating the one or more objects to be occluded.

11. The computer-implemented method of claim 10, wherein the depth-based object layering comprises not occluding a first set of one or more of the objects on the surface based at least in part on the mapping indicating the one or more objects to be occluded, and occluding a second set of one or more of the objects on the surface based at least in part on the mapping indicating the one or more objects to be occluded.

12. The computer-implemented method of claim 4, wherein the inserting inserts the graphic into a portion of the frame that does not include an object of the plurality of objects.

13. The computer-implemented method of claim 4, wherein the inserting is according to a predefined attribute.

14. The computer-implemented method of claim 4, wherein the graphic is a three-dimensional animation.

15. A non-transitory computer-readable medium storing code that, when executed by a device, causes the device to perform a method comprising:

receiving a video;

generating, by a machine learning model, a mapping indicating one or more objects to be occluded of a plurality of objects depicted in a frame based at least in part on an input of a mapping of a surface in the video to a frame of the video, and an indication of the plurality of objects depicted in the frame; and inserting a graphic into the frame of the video based at least in part on the mapping indicating the one or more objects to be occluded.

16. The non-transitory computer-readable medium of claim 15, wherein the indication comprises an object segmentation map, and the generating comprises:

determining a pixel of an individual object of the plurality of objects depicted in the frame that is closest to the surface;

determining a position of the pixel for the individual object from the mapping; and applying the position of the pixel for the individual object to a plurality of pixels of a corresponding object indicated by the object segmentation map to generate the mapping indicating the one or more objects to be occluded.

17. The non-transitory computer-readable medium of claim 15, wherein the inserting comprises a depth-based object layering based at least in part on the mapping indicating the one or more objects to be occluded.

18. The non-transitory computer-readable medium of claim 17, wherein the depth-based object layering comprises not occluding a first set of one or more of the objects on the surface based at least in part on the mapping indicating the one or more objects to be occluded, and occluding a second set of one or more of the objects on the surface based at least in part on the mapping indicating the one or more objects to be occluded.

19. The non-transitory computer-readable medium of claim 15, wherein the inserting is according to a predefined attribute.

20. The non-transitory computer-readable medium of claim 19, wherein the graphic is a three-dimensional animation.

* * * * *